June 7, 1960  J. R. GRANT  2,939,602
CARTONS FOR EGGS
Filed Oct. 30, 1956  19 Sheets-Sheet 1
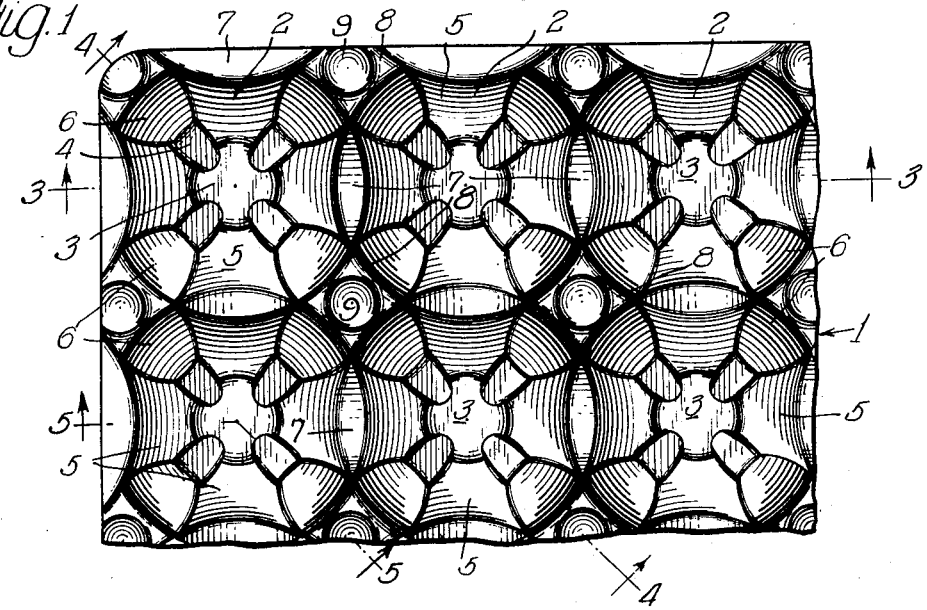
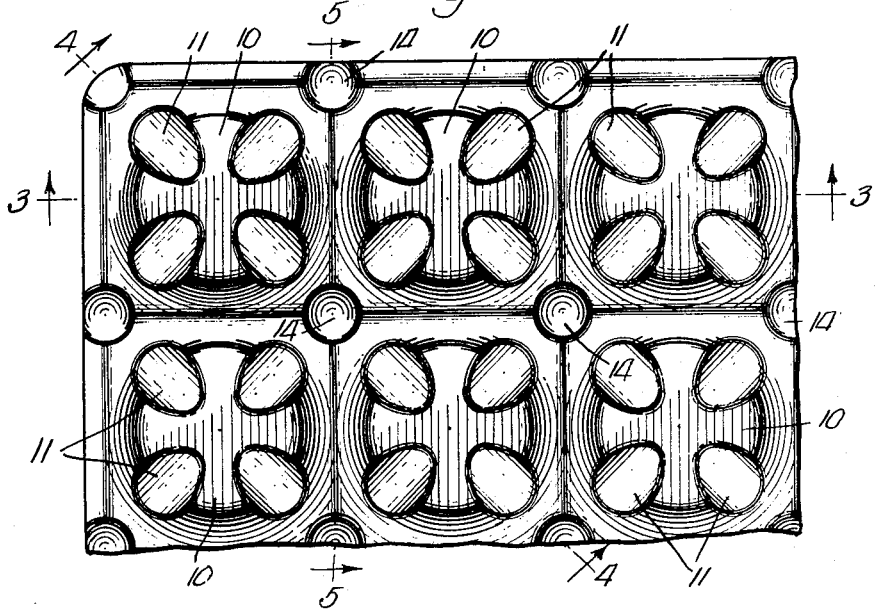
INVENTOR.
Jesse R. Grant
BY
Karl W. Flocks

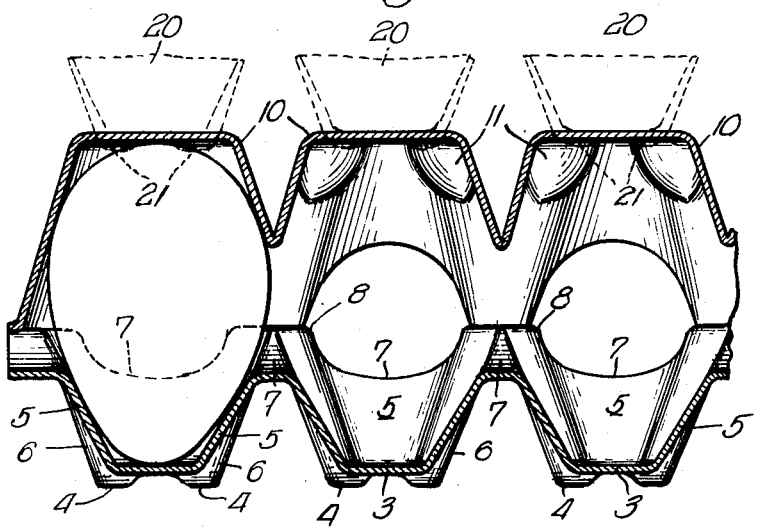
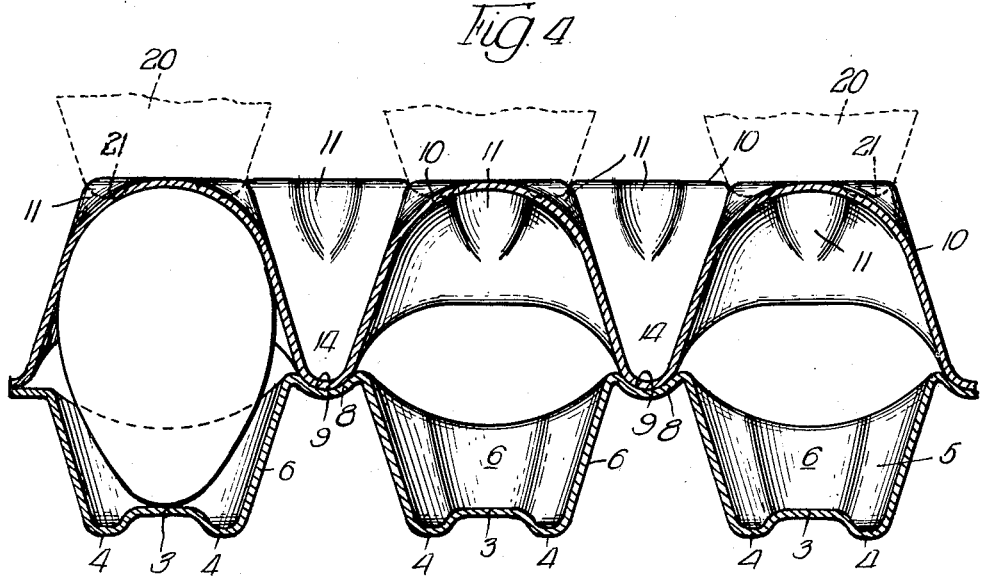

June 7, 1960  J. R. GRANT  2,939,602
CARTONS FOR EGGS
Filed Oct. 30, 1956  19 Sheets-Sheet 3

INVENTOR.
Jesse R. Grant
BY
KARL W. FLOCKS
atty

INVENTOR.
Jesse R. Grant
BY
KARL W. FLOCKS

June 7, 1960  J. R. GRANT  2,939,602
CARTONS FOR EGGS

Filed Oct. 30, 1956  19 Sheets-Sheet 5

INVENTOR
Jesse R. Grant
BY Karl W. Flocks
ATTORNEY

June 7, 1960    J. R. GRANT    2,939,602
CARTONS FOR EGGS

Filed Oct. 30, 1956    19 Sheets-Sheet 6

INVENTOR
Jesse R. Grant

BY Karl W. Flocks
ATTORNEY

June 7, 1960 J. R. GRANT 2,939,602
CARTONS FOR EGGS

Filed Oct. 30, 1956 19 Sheets-Sheet 7

INVENTOR
Jesse R. Grant
BY Karl W. Flocks
ATTORNEY

June 7, 1960     J. R. GRANT     2,939,602
CARTONS FOR EGGS

Filed Oct. 30, 1956     19 Sheets-Sheet 8

INVENTOR
Jesse R. Grant

By Karl W. Flocks
ATTORNEY

June 7, 1960 J. R. GRANT 2,939,602
CARTONS FOR EGGS

Filed Oct. 30, 1956 19 Sheets-Sheet 9

INVENTOR
Jesse R. Grant

BY Karl W. Flocks
ATTORNEY

June 7, 1960  J. R. GRANT  2,939,602
CARTONS FOR EGGS
Filed Oct. 30, 1956  19 Sheets-Sheet 11

INVENTOR
Jesse R. Grant
BY Karl W. Flocks
ATTORNEY

June 7, 1960  J. R. GRANT  2,939,602
CARTONS FOR EGGS

Filed Oct. 30, 1956  19 Sheets-Sheet 12

INVENTOR
Jesse R. Grant

BY Karl W. Flocks
ATTORNEY

June 7, 1960        J. R. GRANT        2,939,602
CARTONS FOR EGGS
Filed Oct. 30, 1956                 19 Sheets-Sheet 13
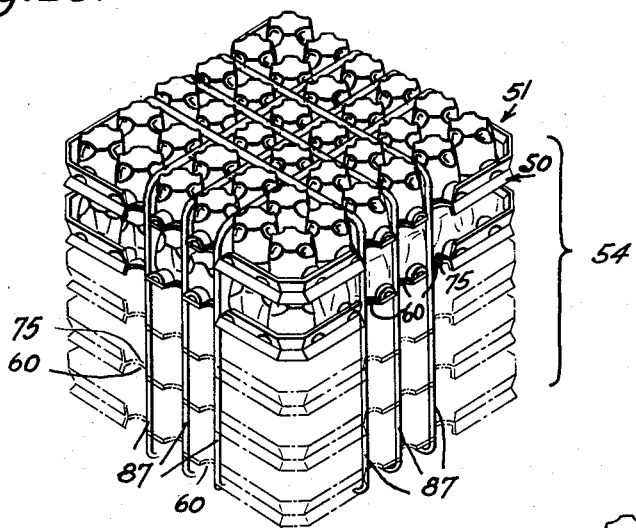
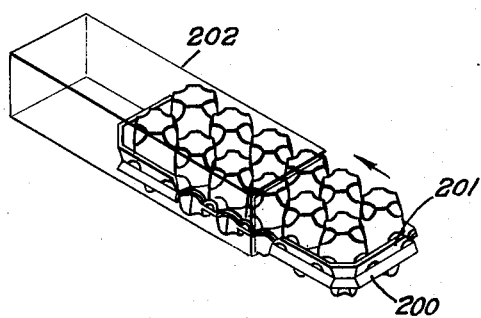
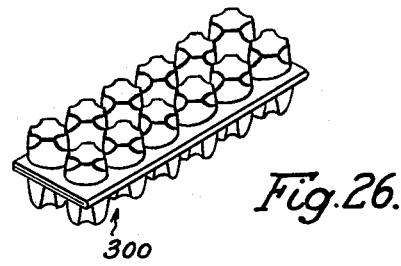
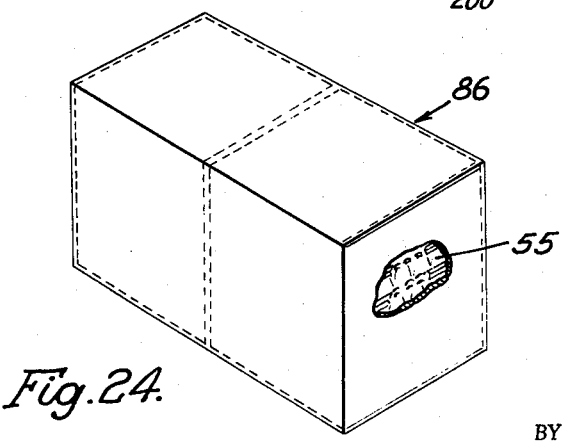
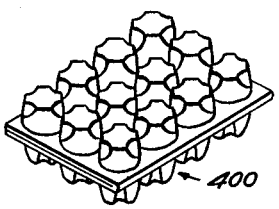
INVENTOR
Jesse R. Grant
BY Karl W. Flocks
ATTORNEY

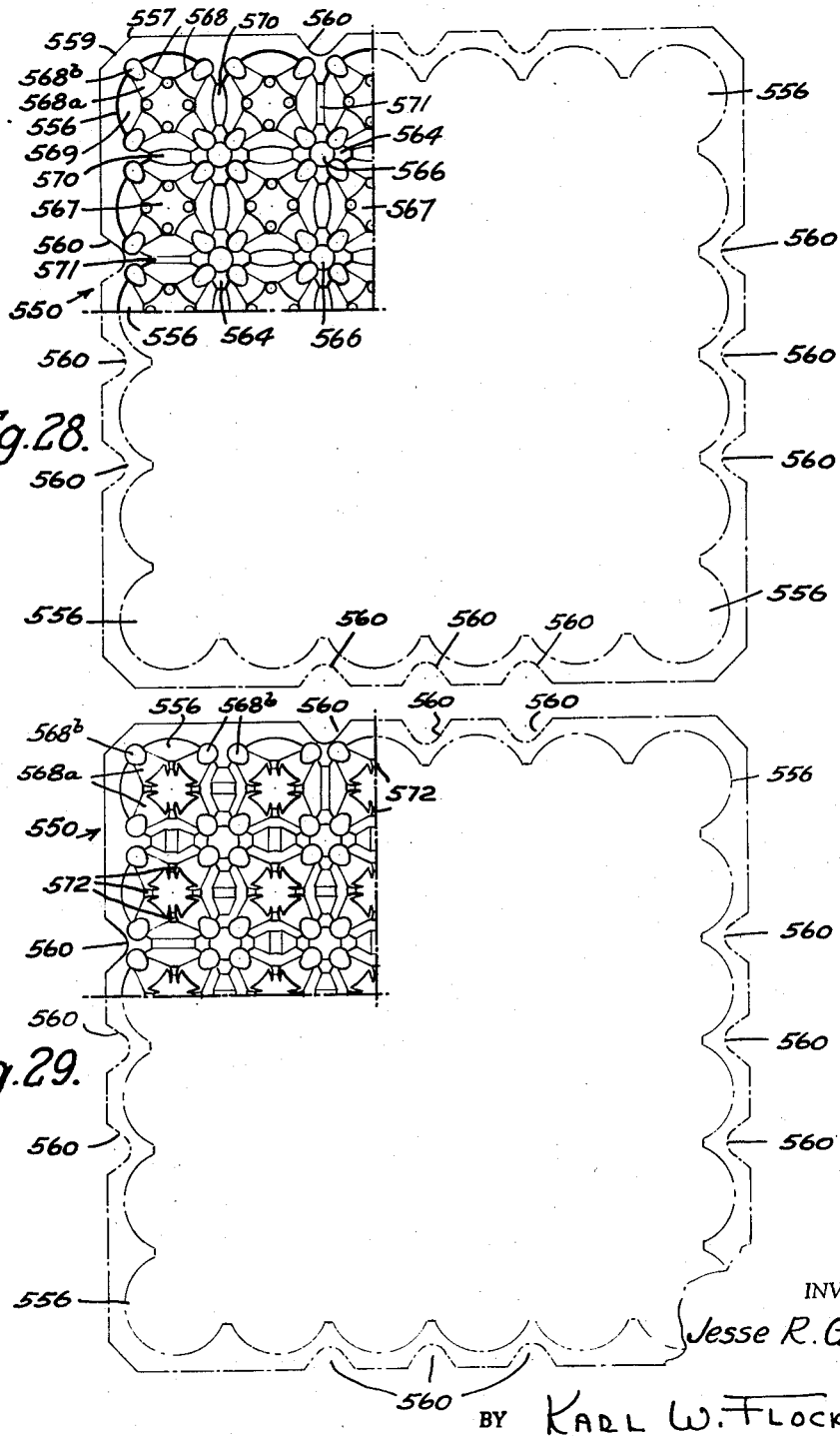

INVENTOR
Jesse R. Grant
BY Karl W. Flocks
ATTORNEY

June 7, 1960  J. R. GRANT  2,939,602
CARTONS FOR EGGS
Filed Oct. 30, 1956  19 Sheets-Sheet 16

INVENTOR
Jesse R. Grant
BY Karl W. Flocks
ATTORNEY

INVENTOR
Jesse R. Grant
BY Karl W. Flocks
ATTORNEY

June 7, 1960 J. R. GRANT 2,939,602
CARTONS FOR EGGS
Filed Oct. 30, 1956 19 Sheets-Sheet 19

INVENTOR
Jesse R. Grant
BY Karl W. Flocks
ATTORNEY

United States Patent Office 2,939,602
Patented June 7, 1960

2,939,602

CARTONS FOR EGGS

Jesse R. Grant, 6838 Jeffery Ave., Chicago, Ill.

Filed Oct. 30, 1956, Ser. No. 619,165

20 Claims.  (Cl. 217—26.5)

This invention relates to cartons for eggs. More specifically, the invention relates to trays and covers, cartons made of trays and covers, nests of trays, nests of covers, stacks of complementary trays and covers, egg packaging, and egg packages made of portions of trays and covers.

This application is a continuation-in-part of my co-pending application Serial No. 375,112, filed August 19, 1953, entitled "Cartons for Eggs," now abandoned.

In the marketing of eggs, a shipper at a collecting point gathers eggs from the farmers and after candling and grading the eggs packs them for shipment in carload lots to markets, usually located in large cities.

Most of the eggs so shipped to market are packed in cases containing thirty dozen eggs, wherein the eggs are protected by so-called fillers and flats. At the market the car of eggs is sold, either on the basis of an official grading or otherwise, and in case the purchaser is a jobber he must then work over the car of eggs to place the eggs in cartons for delivery to his retail outlets and through them to the ultimate consumers.

Each time an egg is handled, its quality is depreciated and also rehandling expense is involved. Obviously, then, if there were available cartons into which the shipper could pack the eggs at the collecting point, so that the jobber who purchased the carload of eggs would not have to rehandle them before delivery to the retailer, the quality of the egg would be less deteriorated and rehandling expense would be eliminated.

Not all eggs shipped to an open market are purchased by jobbers for immediate delivery to the retail trade, but rather varying proportions of the eggs received at the market are purchased for storage and future delivery to the retail trade; consequently, to be satisfactory to the shipper, the cartons must meet certain definite requirements. They must be easily opened without damage to themselves, so as to permit checking for damage to the eggs in shipment and spot-checking by the market officials if the car is to be officially graded. The cartons must be of such construction that the eggs may be handled into and out of the carton in accordance with established practices usually referred to as "commercial handling." The cartons must be capable of being put into cold storage, there to remain without deterioration, for future delivery of the eggs to the retail trade.

Commercial handling of eggs is necessary where a car of graded eggs is to be subjected to an official grading, a buyer's inspection and in cases where there has been excessive damage such as would occur if the car had been involved in a wreck. A car of current receipts must also be handled commercially for grading, candling, etc. Eggs taken out of storage likewise must be commercially handled for grading, etc.

In addition to the shipment of eggs to an open market, each year finds an increasing number of eggs involved in what is known as direct shipment, either to a jobber or retailer or ultimate consumer. In such direct shipments, commercial handling of the eggs out of the carton is not so important except where there is excessive damage as the eggs are not ordinarily removed from the cartons by the jobber and cartons are now being used, notwithstanding that none now available on the open market is free from characteristics which are objectionable both to the shipper and jobber.

Any carton to be satisfactory for general use, in addition to the foregoing requirements, must, of course, protect the eggs in shipment to minimize, if not entirely eliminate damage in shipment. Furthermore, although eggs are supposed to be packed tips down, it often happens that some eggs, at least, are packed with the large ends down, and the carton therefore must be capable of protecting eggs regardless of whether or not they are properly placed in the carton.

Frequently shippers ship a car of ungraded eggs, that is "current receipts" which are the eggs just as received from the farms. In such shipments, there is considerable variation in the size of the eggs, and to be satisfactory the carton must adequately protect all of the eggs, the largest as well as the smallest. It sometimes happens in current receipt shipments that the eggs will be placed in the cartons at the farms and many of the eggs will be packed large end down instead of in the approved manner with the small end down. The carton must afford protection to the egg under such circumstances.

Prior to my invention, fillers and flats have been utilized in association with egg cases for the packaging and shipping of eggs; filler-flats have also been utilized for this purpose. In connection with such prior uses, the results obtained have been inefficient either in the sense that the eggs have not been fully protected or in the sense that the utilization of the filler-flats heretofore known has required excessive handling or special preparations and techniques of use varying from the usual or required procedures, arrangements and constructions. In some prior forms unorthodox arrangement of eggs is required with attendant special techniques of packaging and unloading. In the utilization of these prior procedures and constructions there have been far too frequent instances of miscounts and disarrangements which were often overlooked even after inspection at the time of packaging but which became obvious at the time of unloading and upon reinspection. In some prior attempts at the solutions to the problems which this invention solves, which prior attempts involved unusual egg arrangements, there is far too much space in some portions of the package and less than the optimum of the required space in other portions, and in some instances adjacent eggs are directly in contact with opposite walls of a relatively thin partition with the result that the danger of breakage is materially increased.

It is an object of the invention to provide a molded carton for eggs which may be used by a shipper to pack eggs for sale through the regular channels of trade and also for so-called direct shipments.

Another object of the invention is to provide in a molded carton for eggs an improved cup that is cushioned by feet depending below the egg space in the cup and wholly outside of that space which cushioning obviates the necessity of using a bottom pad in an egg case.

Another object of the invention is to provide in a molded carton a cover that is easily removed to permit inspection of the eggs and is adapted to be locked on the tray of the carton in such manner as to prevent movement of the cover laterally with respect to the carton.

Another object of the invention is to provide a molded egg cup in the tray of a carton, which is flexible and capable of being distorted to accommodate eggs of various dimensions and to cushion the egg within the cup.

Another object of the invention is to provide cartons consisting of trays and covers which when stacked one above the other are locked together against lateral movements in the stack and are cushioned one against the other directly.

Another object of the invention is to provide in a carton a molded cover having inverted egg cups into the upper ends of which depressions are formed to bear lengthwise on an egg and into which depressions the feet of a second tray are registered to lock that tray with respect to the cover.

It is a further object of the invention to provide a novel multi-leg cell in an egg tray.

It is a further object of the invention to provide a novel plastic cellular egg carton.

It is a further object to provide a novel generally rectangular molded pulp egg tray.

It is a further object to provide a novel stack of egg cartons.

It is a further object of the invention to provide a novel egg package.

It is a further object of the invention to provide a novel bundled stack of egg cartons.

It is a further object of the invention to teach a novel process of egg packaging.

Other objects and the nature and advantages of the instant invention will be apparent from the following description taken in conjunction with the accompanying drawings, wherein:

Fig. 1 is a plan view of a fragmentary portion of the tray of one form of my improved carton when viewed from the top and showing the egg receiving cells;

Fig. 2 is a plan view of a fragmentary portion of the cover of one form of my improved carton when viewed from the top and showing the recesses over the top of each egg cell which recesses have their axes oriented in a direction generally pointing toward what would be the vertical axis of an egg when disposed within an egg cell;

Figure 5:
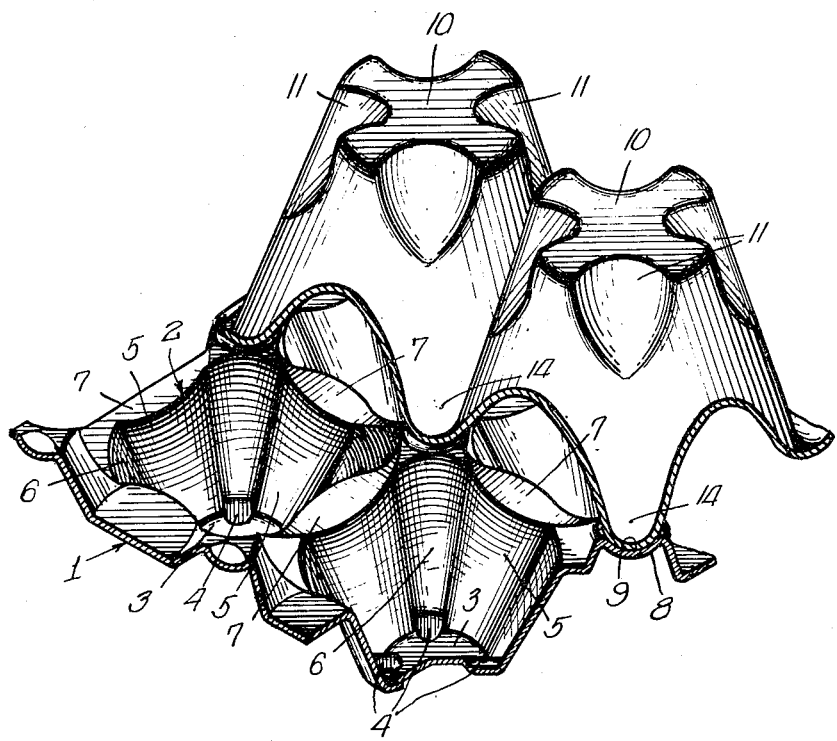
Figure 6:
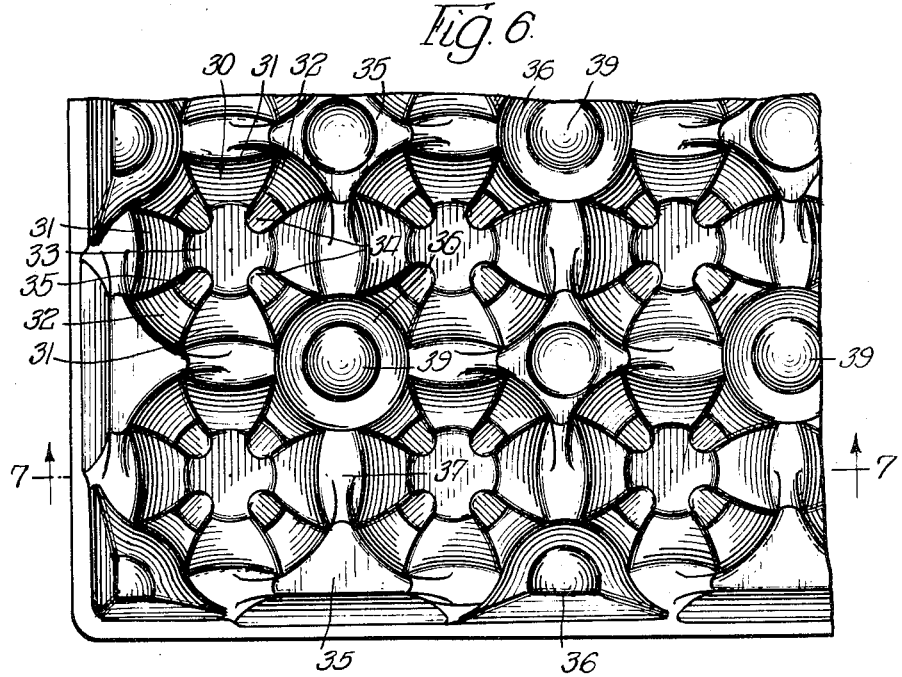
Figure 7:
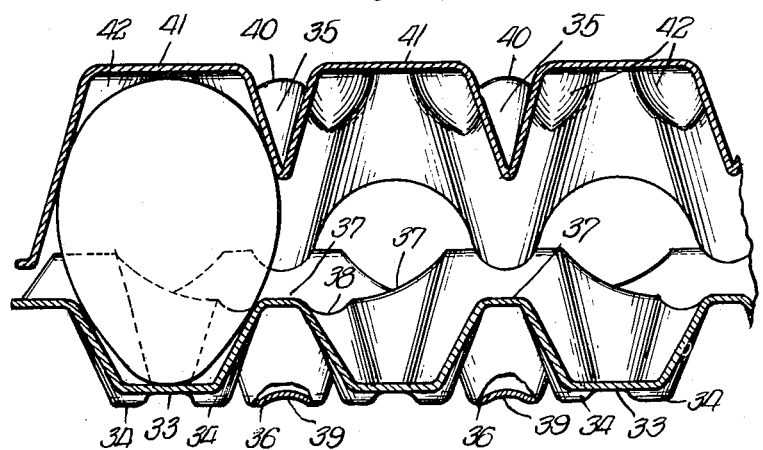
Figure 8:
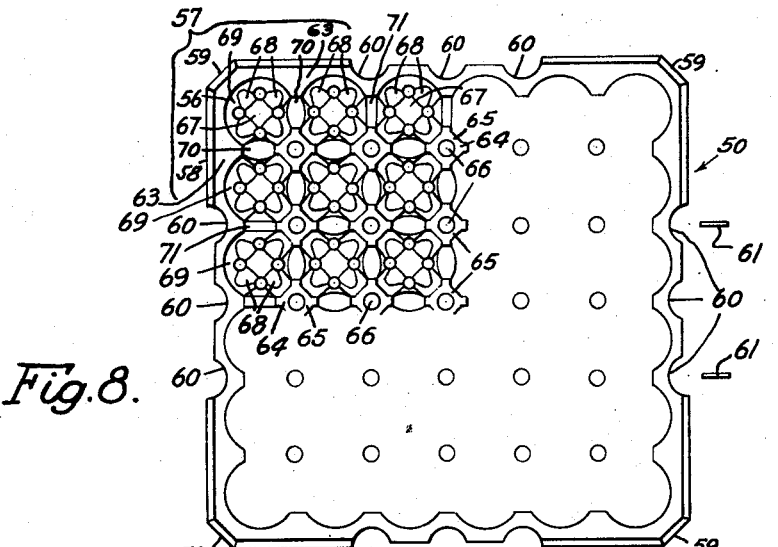
Figure 9:
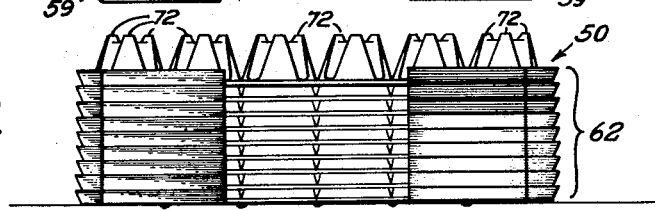
Figure 10:
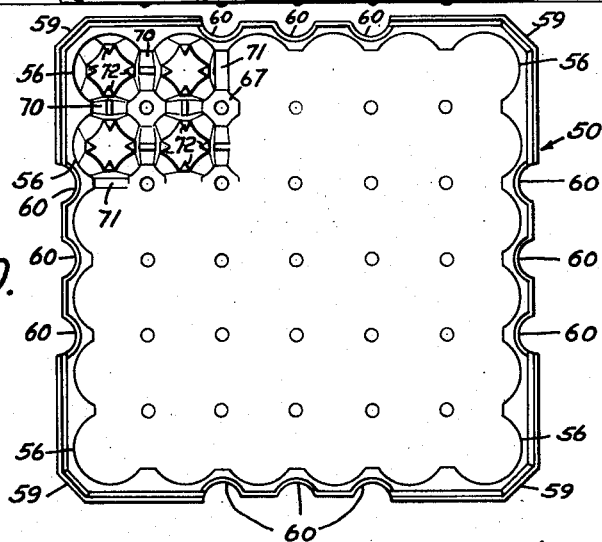
Figure 8A:
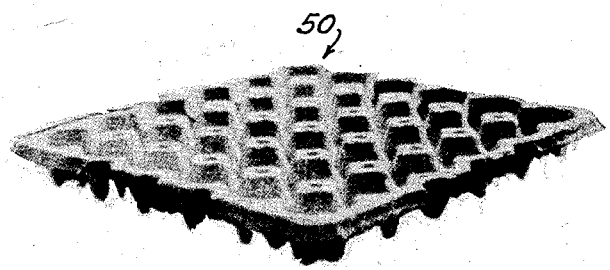
Figure 10A:
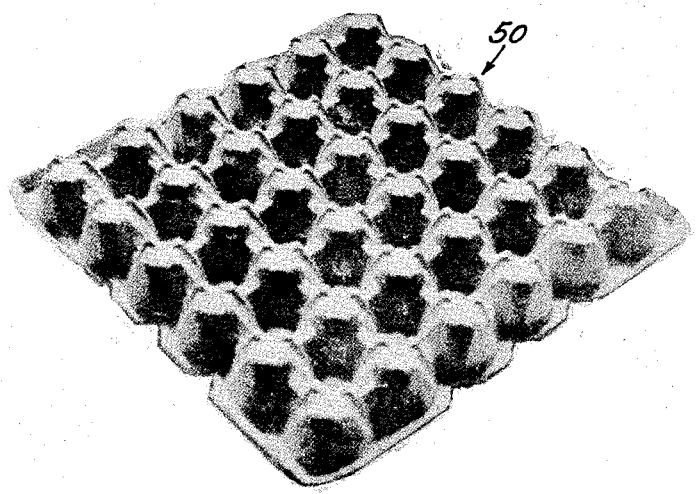
Figure 11:
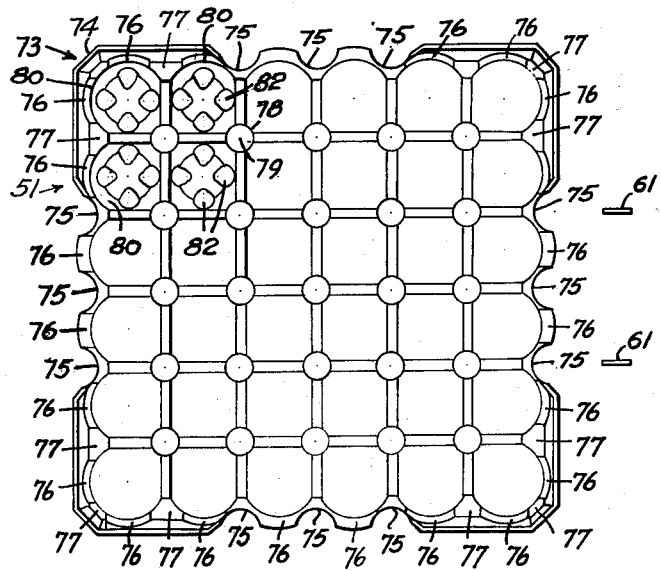
Figure 12:
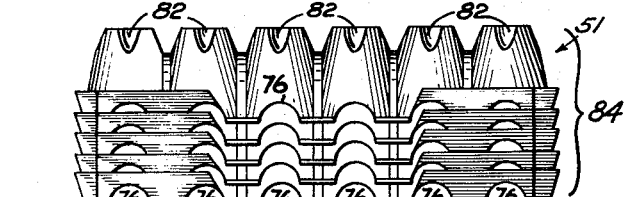
Figure 13:
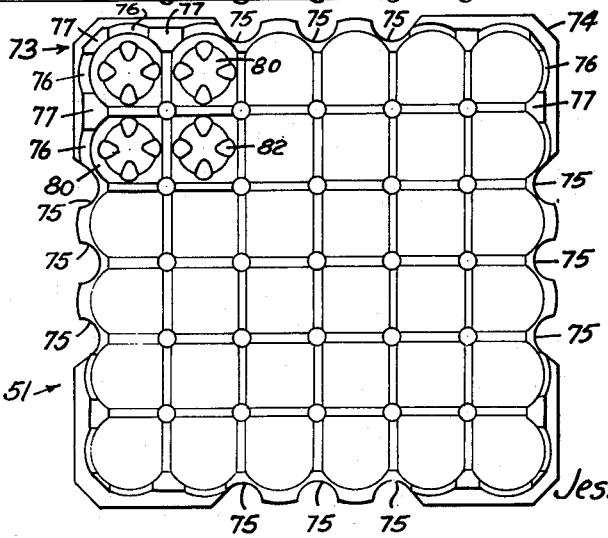
Figure 13A:
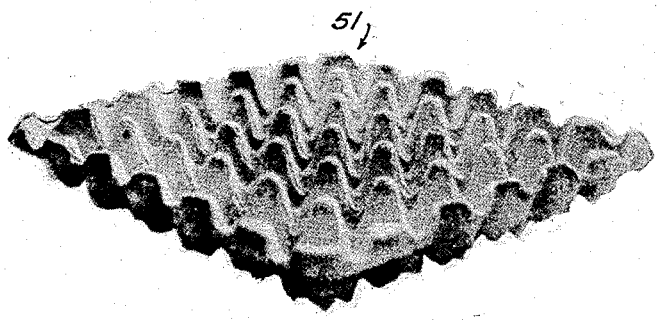
Figure 11A:
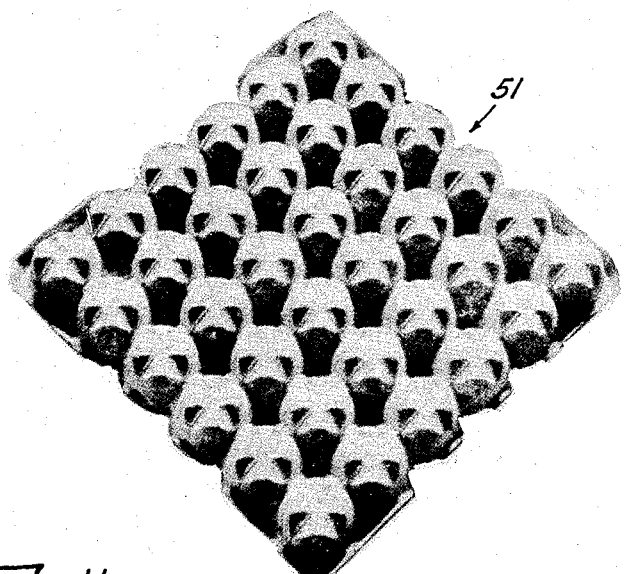
Figure 14:
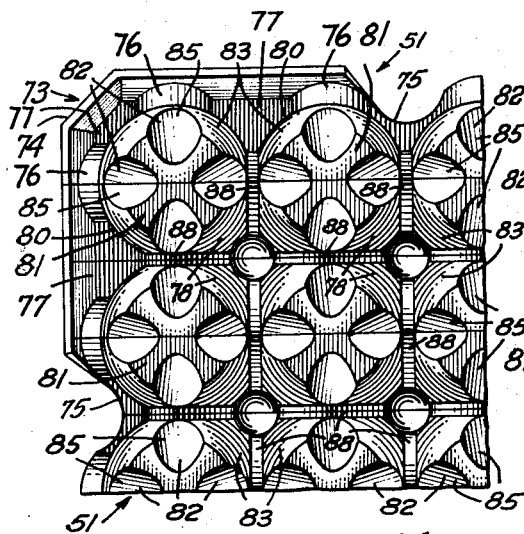
Figure 15:
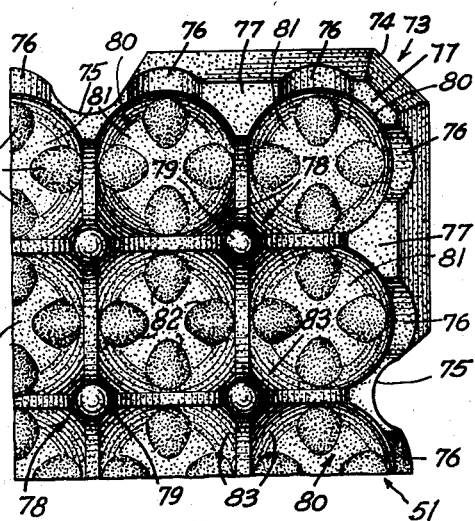
Figure 16:
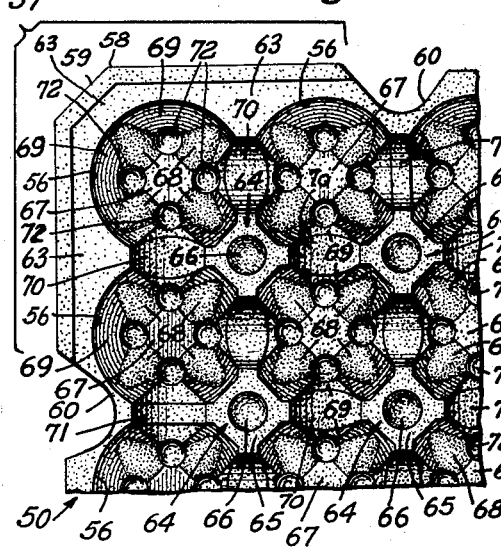
Figure 17:
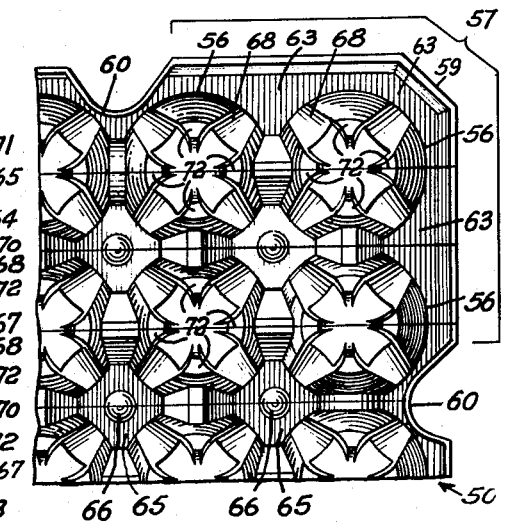
Figure 18:
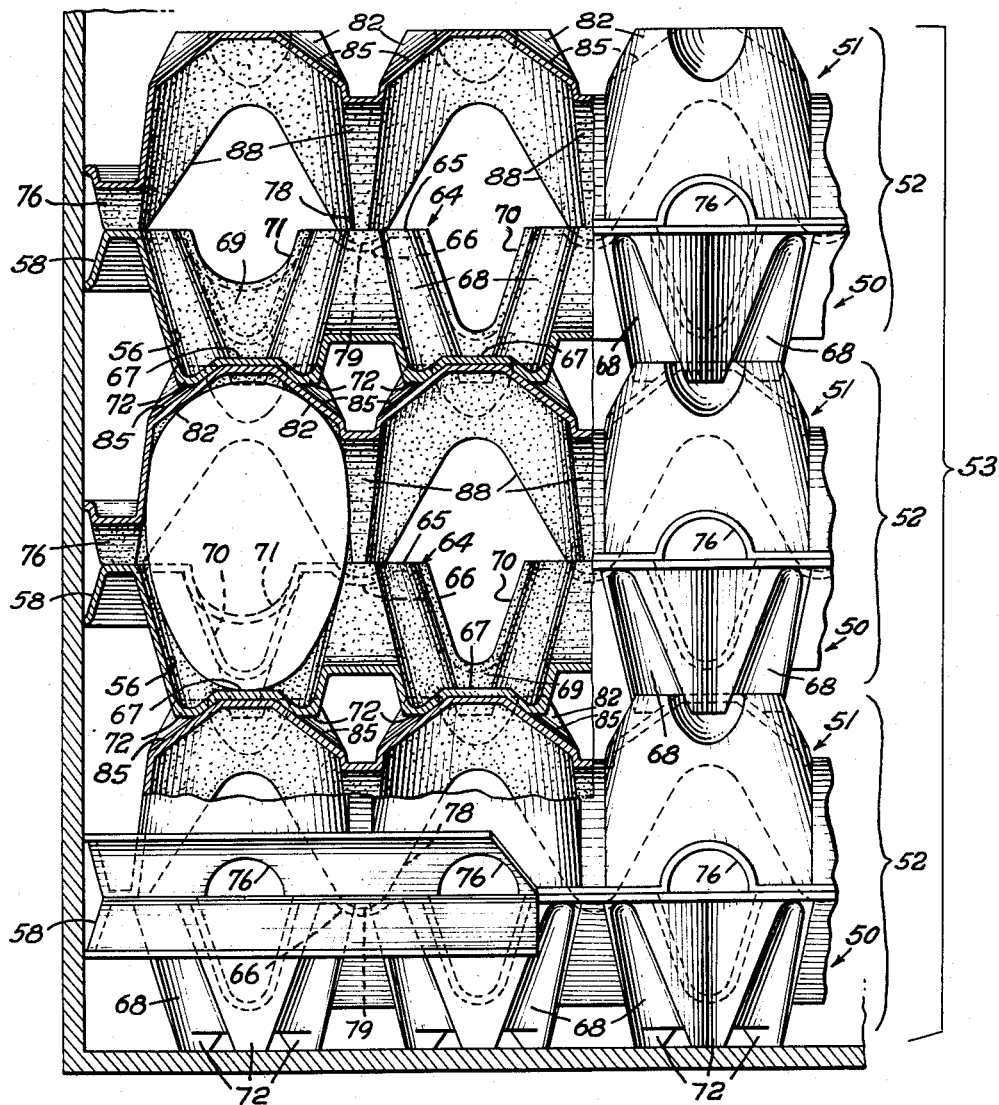
Figure 19:
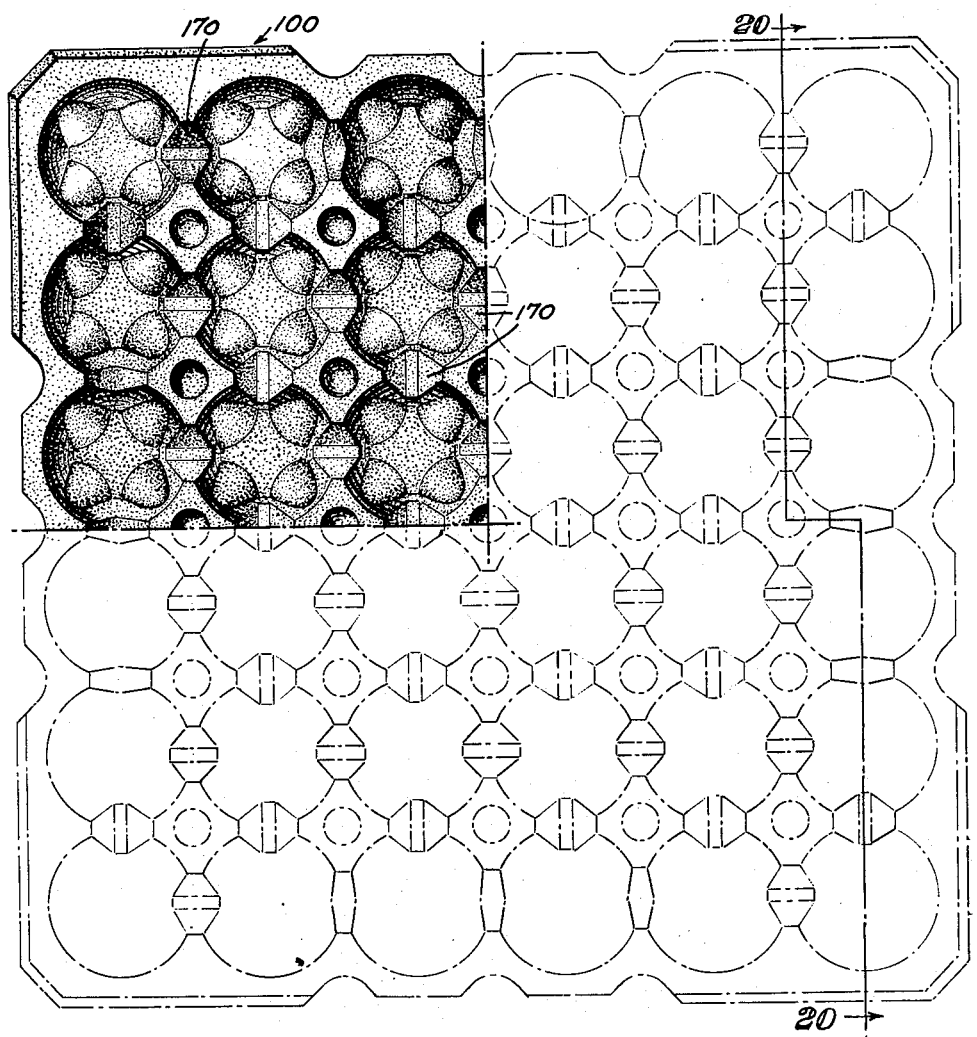
Figure 20:
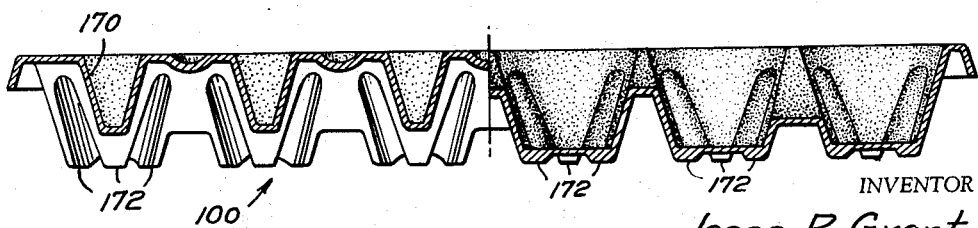
Figure 21:
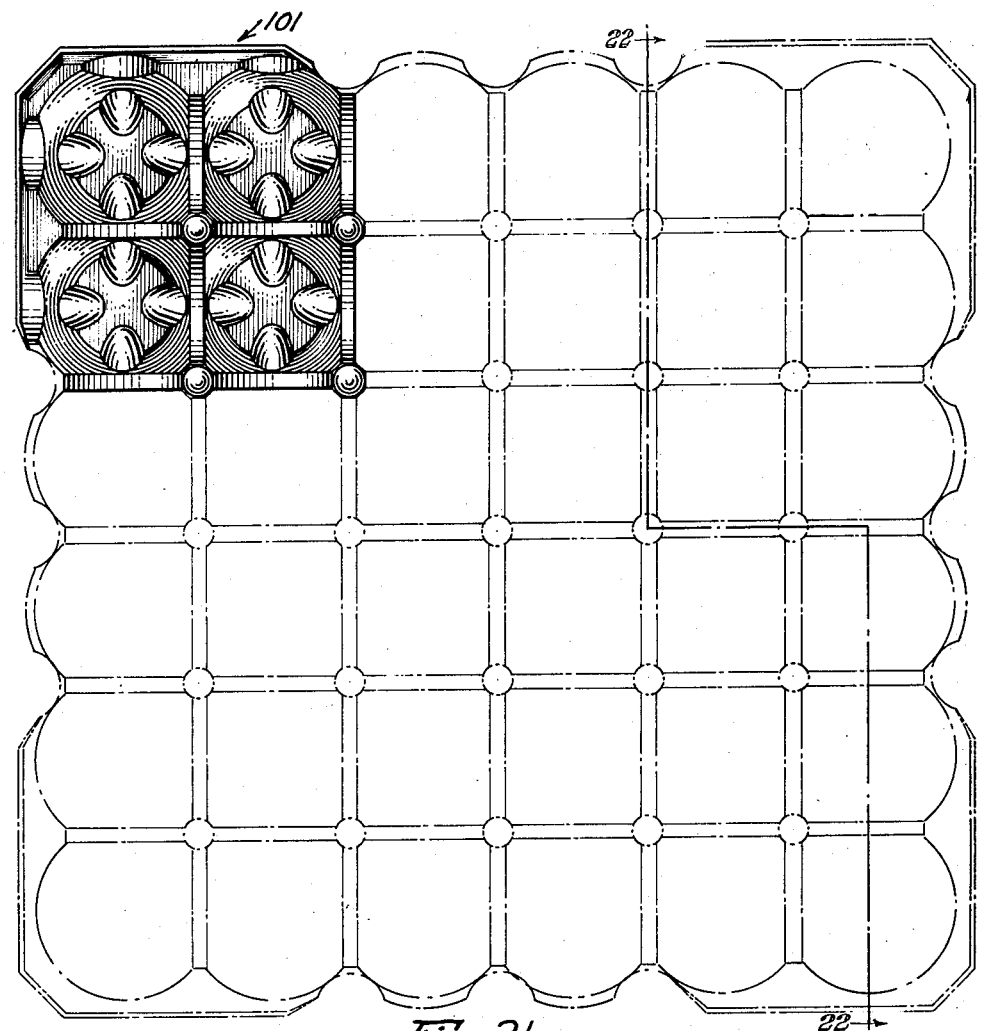
Figure 22:
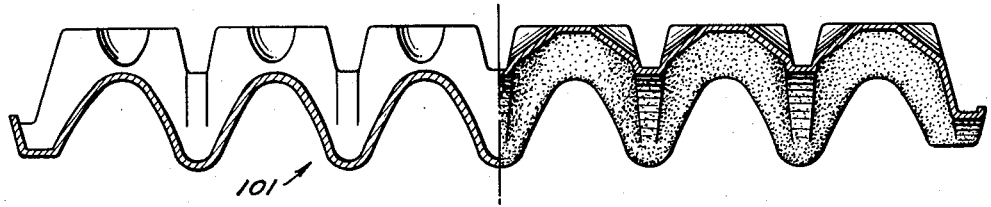
Figure 28A:
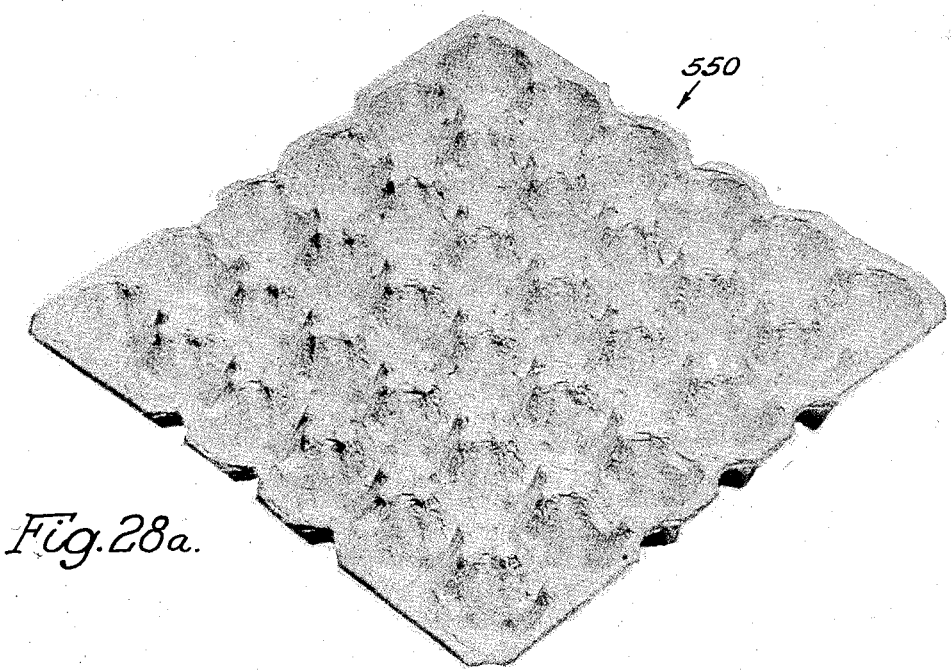
Figure 29A:
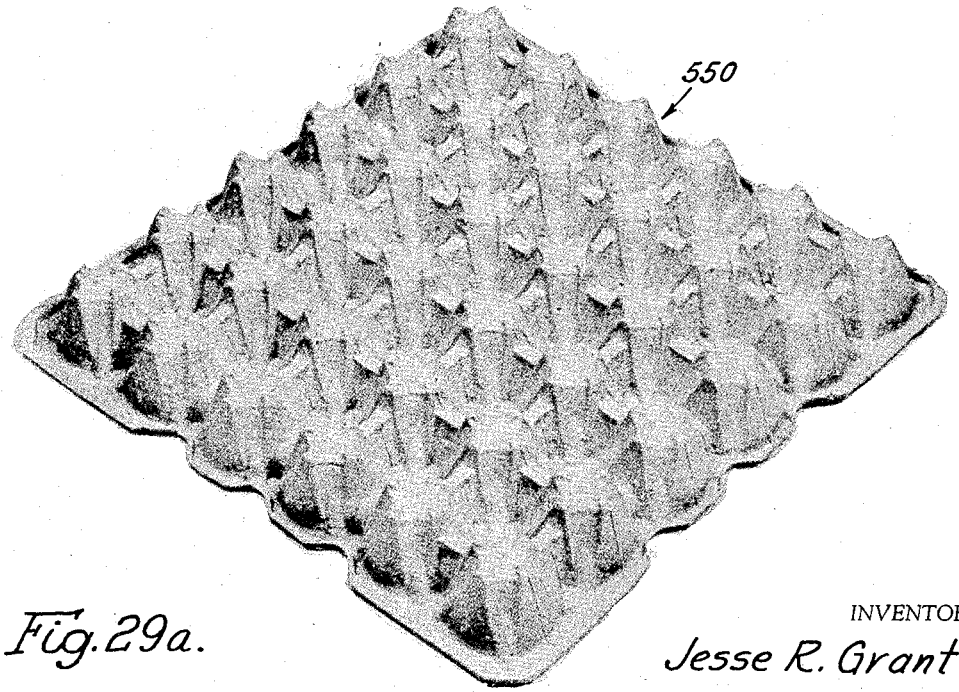
Figure 30:
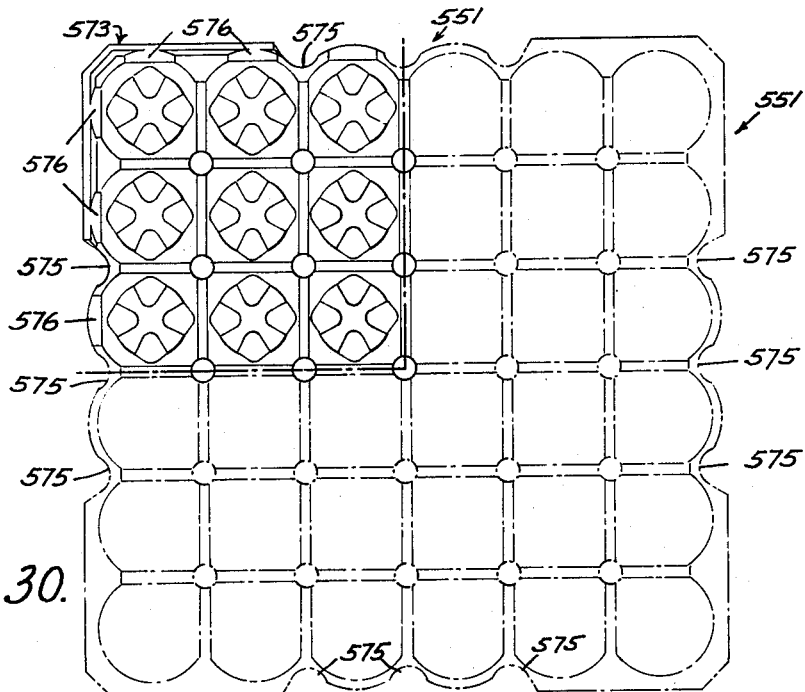
Figure 31:
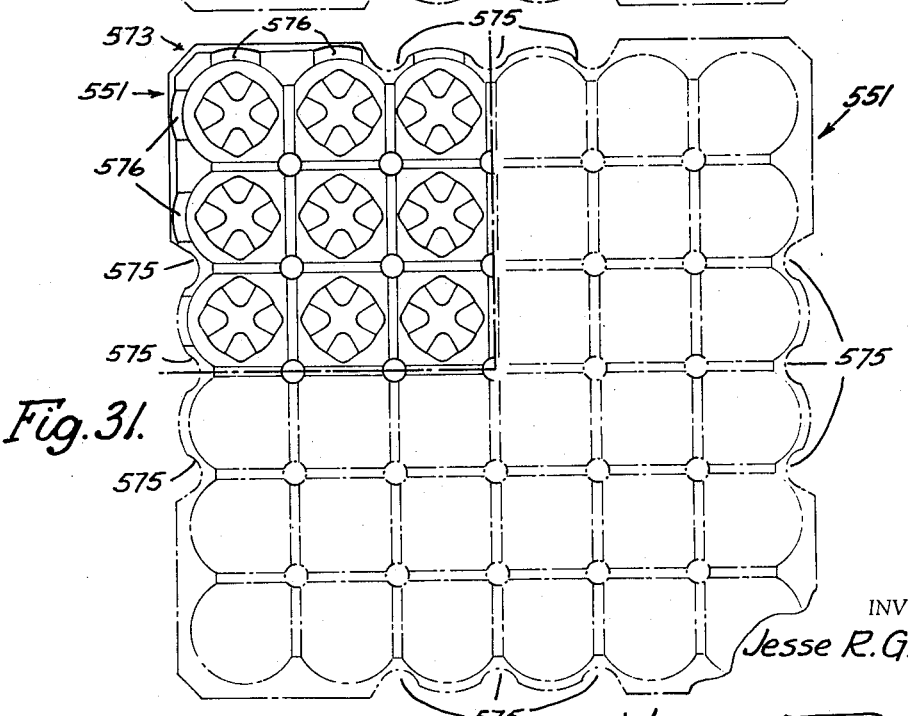
Figure 30A:
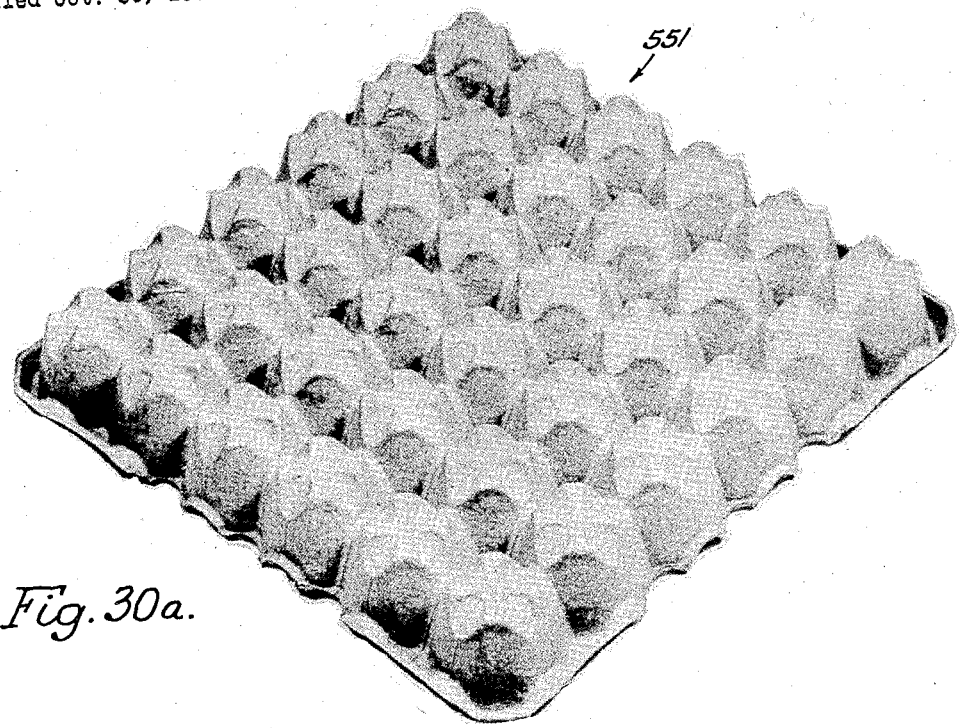
Figure 31A:
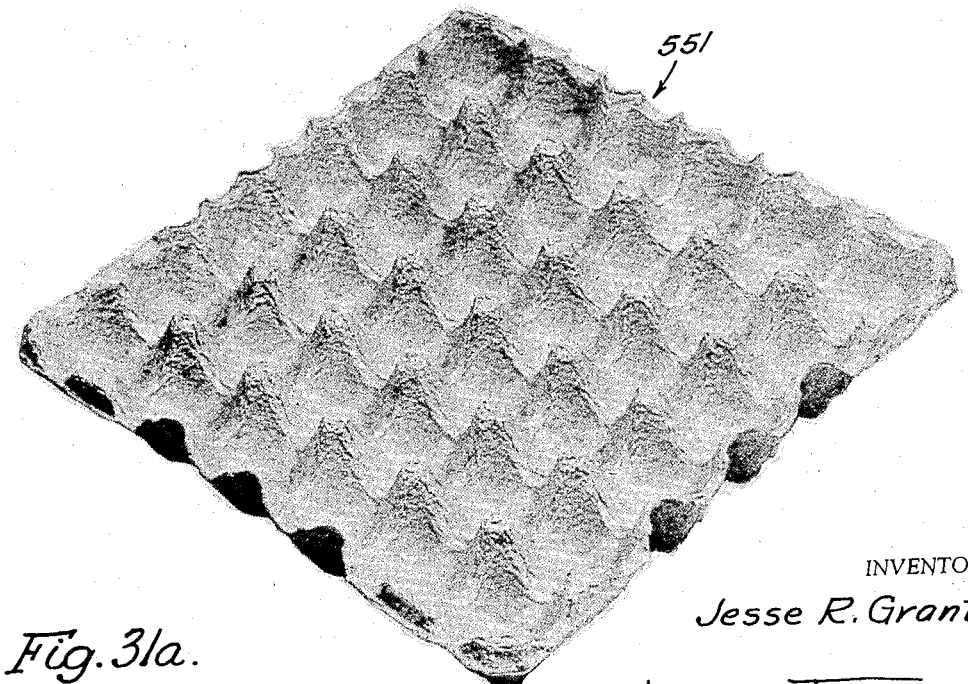
Figure 32:
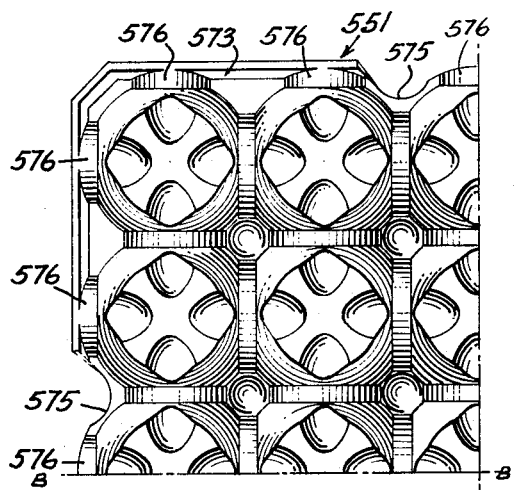
Figure 33:
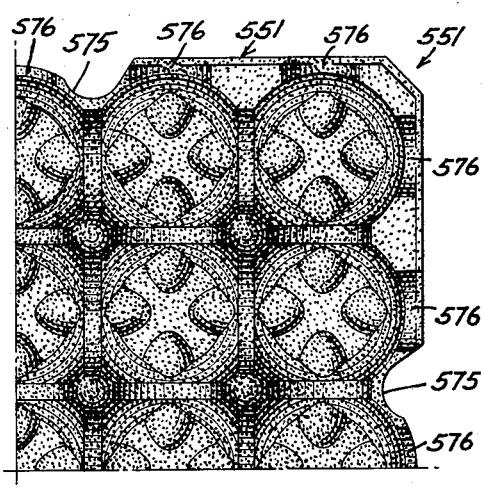
Figure 34:
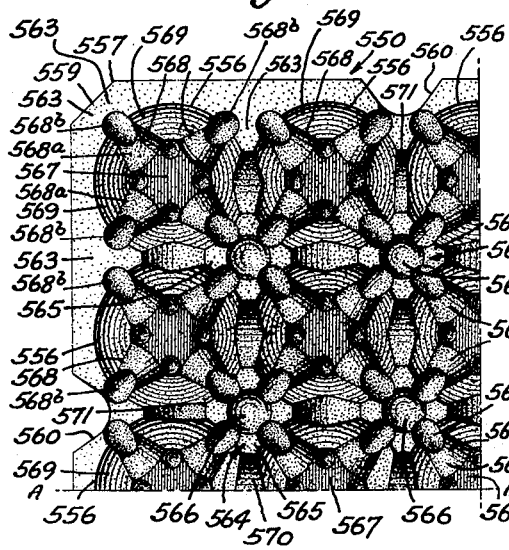
Figure 35:
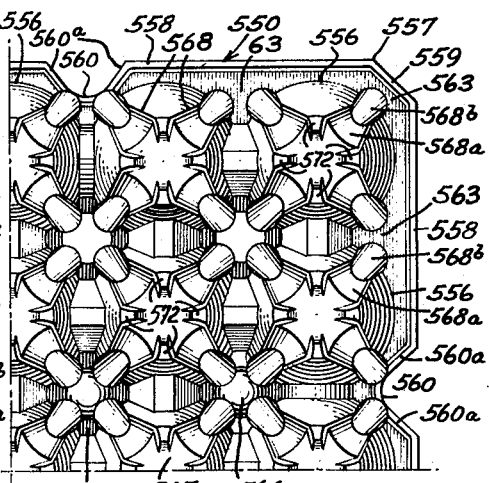
Figure 36:
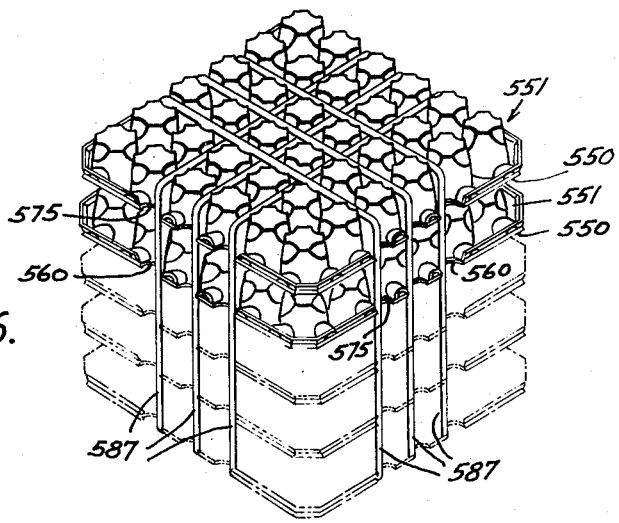
Figure 37:
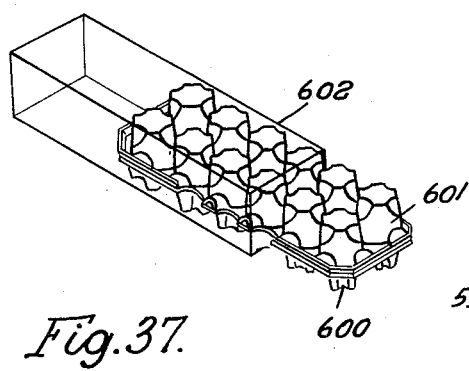
Figure 38:
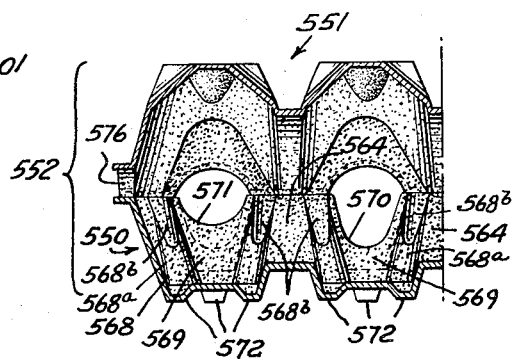

Fig. 3 is a cross-sectional view taken substantially along the line 3—3 of Figs. 1 and 2, looking in the direction of the arrows and showing the tray and cover of Figs. 1 and 2 respectively registered together;

Fig. 4 is a cross-sectional view taken along the line 4—4 of Figs. 1 and 2, looking in the direction of the arrows;

Fig. 5 is a fragmentary perspective view of the tray and cover of Figs. 1 and 2, respectively, with a part of the tray cut away substantially along the line 5—5 of Fig. 1, and the cover cut away substantially along the line 5—5 of Fig. 2;

Fig. 6 is a plan view of a fragmentary portion of a modified form of tray of my improved carton when viewed from the top and showing the egg receiving cups or cells and in addition in this form of tray there are alternating feet and posts in association with the cups or cells;

Fig. 7 is a cross-sectional view taken along the line 7—7 of the tray of Fig. 6; and to which has been added in superposed relation a fragmentary sectional view of a corresponding cover;

Fig. 8 is a plan view of a nest of a second form of my trays with the top tray being viewed from its top side showing the egg receiving cells and with a portion of said cells being shown in complete form and the remainder indicated schematically;

Fig. 8a is a view in perspective taken from above and generally to one side of the form of tray illustrated in Fig. 8, showing the relative arrangement of the egg receiving cups or cells and the marginal outline of the tray itself;

Fig. 9 is an end view of the nest of trays shown in Fig. 8 in reverse position and with the tops of the trays facing downwardly;

Fig. 10 is a plan view of the top of the nest shown in Fig. 9 illustrating the bottom side of the tray more completely with respect to some of the exterior portions of the bottom of the egg receiving cups or cells and schematically with respect to the remainder of the cups or cells;

Fig. 10a is a view in perspective of the bottom or underneath side of the tray shown in Fig. 8a and this view (though it is in perspective) generally corresponds to Fig. 10;

Fig. 11 is a plan view of a nest of a preferred form of my covers with the upper cover being viewed from its top side showing the walls forming the egg receiving cells and with a portion of said cells being shown in complete form and the remainder indicated schematically;

Fig. 11a is a view in perspective (almost in plan) of the upper or top side of said cover shown in Fig. 11;

Fig. 12 is an end view of the nest of covers shown in Fig. 11;

Fig. 13 is a plan view of the under or inner side of said covers shown in Figs. 11 and 12 with some of the cells shown in detail and others shown schematically;

Fig. 13a is a view in perspective taken from above and to one side of the under or inner side of said cover shown in Fig. 13;

Fig. 14 is a fragmentary plan view of the upper or top side of the cover shown in Figs. 11 and 11a with the details thereof somewhat enlarged;

Fig. 15 is a fragmentary plan view of the under or inside of the cover shown in Figs. 13 and 13a with the details thereof somewhat enlarged;

Fig. 16 is a fragmentary plan view of the top or inside of the tray shown in Figs. 8 and 8a with the details thereof somewhat enlarged;

Fig. 17 is a fragmentary plan view of the under or bottom side of the tray shown in Figs. 10 and 10a with the details thereof somewhat enlarged;

Fig. 18 is an enlarged fragmentary vertical sectional view with parts shown in elevation of a partial stack of cartons including trays and covers of the character illustrated in Figs. 8–17;

Fig. 19 is a plan view of the upper or inner or top side of a modified form of tray in accordance with my invention with some of the cups or cells shown in detail and with the remainder shown schematically;

Fig. 20 is a vertical sectional view taken generally along the line 20—20 of Fig. 19 and looking in the direction of the arrows;

Fig. 21 is a plan view of the upper or top side of a modified form of cover adapted to be used to complement the tray of Fig. 19 with some portions shown in detail and others shown schematically;

Fig. 22 is a vertical sectional view taken along the line 22—22 and looking in the direction of the arrows;

Fig. 23 is a view in perspective with portions shown schematically of a bundled stack of egg loaded cartons including trays and covers of the character shown in Figs. 8–17;

Fig. 24 is a view in perspective of an egg crate containing two stacks of my egg loaded cartons;

Fig. 25 is a view in perspective of a novel egg package including portions of the tray and cover shown in Figs. 8–17 and a corresponding sleeve element;

Fig. 26 is a view in perspective of a one-dozen egg carton with the egg receiving cells arranged in two rows of six and with each egg receiving cell corresponding to the egg receiving cells shown in the trays and covers illustrated in Figs. 8–17;

Fig. 27 is a view similar to Fig. 26 but of a modified form of a one-dozen egg carton with the egg receiving cells arranged in three rows of four;

Fig. 28 is a plan view of a preferred form of my tray being viewed from its top side showing the egg receiving cells and with a portion of said cells being shown in complete form and the remainder indicated schematically;

Fig. 28a is a view in perspective (like Fig. 8a) taken from above and generally to one side of the form of tray illustrated in Fig. 28, showing the relative arrangement of the egg receiving cups or cells and the marginal outline of the tray itself;

Fig. 29 is a plan view of the bottom side of the tray illustrated in Figs. 28 and 28a, illustrating some portions of the bottoms of the egg receiving cups or cells in some detail with the remainder of the cups or cells illustrated schematically;

Fig. 29a is a view in perspective of the bottom or underneath side of the tray shown in Figs. 28 and 28a, and this view (though it is in perspective) generally corresponds to Fig. 29;

Fig. 30 is a plan view of my preferred form of cover as it is viewed from the top side showing the walls forming the inverted cup-like egg receiving cells and with a portion of said cells being shown in complete form and the remainder indicated schematically;

Fig. 30a is a view in perspective of the upper or top side of such cover shown in Fig. 30;

Fig. 31 is a plan view of the under or inner side of said cover shown in Fig. 30 with some of the cells shown in detail and others shown schematically;

Fig. 31a is a view in perspective taken from above and to one side of the under or inner side of said cover shown in Fig. 31;

Fig. 32 is a fragmentary plan view of the upper or top side of the preferred form of cover shown in Figs. 30, 30a with the details thereof somewhat enlarged;

Fig. 33 is a fragmentary plan view of the under or inner side of the preferred form of cover shown in Figs. 31 and 31a with the details thereof somewhat enlarged;

Fig. 34 is a fragmentary plan view of the top or inside of the preferred form of tray shown in Figs. 28 and 28a with the details thereof somewhat enlarged;

Fig. 35 is a fragmentary plan view of the under or bottom side of the tray shown in Figs. 29 and 29a with the details thereof somewhat enlarged;

Fig. 36 is a view in perspective with portions shown schematically of a bundled stack of egg loaded cartons including trays and covers of the character shown in Figs. 28-35;

Fig. 37 is a view in perspective (like Fig. 25) of a novel egg package including portions of the tray and cover shown in Figs. 28-35 and a corresponding sleeve element; and Fig. 38 is a fragmentary view in vertical section of the assembled tray and cover illustrated in Figs. 28-35 of a scale corresponding to Figs. 32 and 34 and with the section corresponding to the sections taken along lines A—A in Fig. 34 and B—B in Fig. 32.

The carton of the present invention is designed to meet the foregoing requirements. It may be made to hold one dozen eggs or three dozen eggs, and the one dozen cartons may be fitted in an egg case side by side in a layer and the layers stacked one above the other in the case to achieve standard pack. Eggs may be commercially handled into and out of the carton and the cartons may be opened easily so that inspection of the eggs for damage in shipment, etc., may be made. Adequate ventilation is provided so that the cartons may be placed in cold storage for future delivery to the retail market. The carton is provided with an improved cup which through a combination of convex and concave wall sections is made resilient and capable of gripping and firmly holding eggs of all sizes in the twenty-four to twenty-nine ounce per dozen range, and is also capable of supporting and protecting such eggs even though they be packed large end down. The carton is cushioned and requires no bottom pad but rather packs in an egg case without loss of egg space therein. The cartons register together when stacked in an egg case and the use of flats between the layers is not necessary.

In its preferred form, the carton of the present invention consists of a tray and a cover, the tray containing egg cups from the bottom of which four feet depend, so that when the tray is placed in the case, the cups will be elevated off of the bottom thereof and cushioned by the feet and additional cushioning by a bottom pad will not be necessary. Each cup has opposed convex walls with opposed concave walls intervening therebetween and the convex and concave walls are of approximately equal dimension so that each group occupies about one-half the distance around the cup. The convex walls are positioned so as to grip an egg adjacent to its tip, thereby to hold the egg uprightly in the cup. The walls are resilient so that the cup will accommodate itself to eggs of various sizes; in fact, the walls are sufficiently resilient that should an egg be placed with its large end in the cup, it will be held therein. The resiliency in the walls of the cup provide cushioning for the egg within the cup itself.

The top edges of the convex and concave walls are preferably located well below the middle of an egg in the cup so that commercial handling is possible. The concave walls merge into posts which, preferably, likewise terminate below the middle of the egg and contain indentations in their upper surfaces. In cartons designed for use in direct shipments only, the heights of the cups and posts are relatively unimportant since commercial handling of the eggs out of the carton ordinarily is not required.

The cartons also contain a cover having inverted cups adapted to fit over the large ends of the eggs and having feet which register with the posts on the tray and are shaped to engage in the indentations in those posts, thereby to secure the cover against lateral displacement with respect to the tray. Bosses project into the upper ends of the inverted cups to engage the eggs and bear downwardly thereon at points adjacent to the tip of the large end of the egg. These bosses projecting into the inverted cups form depressions in the outer surface thereof, so that when a tray is placed upon the cover the feet on the cups of that tray register with the indentations in the inverted cups thereby to secure the tray laterally with respect to the cover. The direct engagement of the tray of one carton with the cover of the carton beneath it obviates the necessity of using flats or other media between the layers of cartons. Thus, when the compartment of an egg case is filled with cartons placed side by side in a layer, and layer upon layer in the compartment, the cartons will be secured together as a unit the better to protect the eggs during shipment.

Since the feet on the cups fit into the recesses in the cover, the bottoms of the cups rest upon the tops of the inverted cups and there is no loss of egg space in the compartment. The egg space within the carton is a full two and one-half inches in height and of sufficient girth to accommodate eggs of from twenty-four to twenty-nine ounces per dozen. Such eggs comprise about eighty-five percent of the current receipts from the farms. In addition, the resiliency of the cup walls provides cushioning of the egg within the cup itself.

Cartons of the present invention, when in three-dozen size, may conveniently be in the form (with modifications) generally shown in my U.S. Patent No. 2,656,945, issued October 27, 1953, which was filed January 6, 1949, and was pending at the time my application Serial No. 375,112 was filed on August 19, 1953, of which this application is a continuation-in-part.

The trays shown in my Patent No. 2,656,945 may be modified, for example, by including the improved cover of the present invention. The trays of my prior patent have twenty-five feet located in rows between the rows of cups and around the edges of the tray, and have twenty-four posts alternated with feet in the rows. The covers are provided with twenty-four feet and twenty-five posts similarly located and alternated. The improved cups are each equipped with four feet for a total of one hundred forty-four feet in the three-dozen tray. With this arrangement the bottom tray in a case compartment will have one hundred sixty-nine points of contact with the case and will thus be stronger and better able to support the load in the compartment. Resiliency will not be lost and the protection of the eggs in the lower layer will be enhanced.

Preferably the bottom surfaces of the feet on the tray are made slightly concave and the tops of the posts on the covers made convex so that when a tray is placed on the cover the posts will fit in the indentations in the feet and aid in preventing lateral displacement of the tray on the cover. The feet on the tray cups register with the indentations in the inverted cups with the result that the tray is securely locked against lateral displacement with respect to the cover. Since the feet on the cover register with indentations in the posts on the tray, the stack in a compartment in an egg case will be held together as a unit and the eggs will be better protected.

Referring to the drawings, and specifically to the form of the invention shown in Figs. 1–5, inclusive, it will be understood that the tray 1 contains egg cups 2 uniformly spaced apart in the tray. Fig. 1 shows six such cups and it will be understood that the tray may consist of two rows of six cups each, or six rows of six cups each, within the teaching of the invention. Each of the cups 2 contains a bottom 3, which may or may not be planar, from which feet 4 depend, and when these feet engage the bottom of an egg case they elevate the bottom 3 thereabove to provide cushioning. Convex wall sections 5, which are shown to be four in number, extend upwardly and outwardly from the edges of the bottom 3. Concave wall sections 6, likewise shown to be four in number and intervening between the convex wall sections 5, extend upwardly and outwardly from the feet 4 and merge into the convex wall sections and into the feet. Convex wall sections 5 of adjacent cups define walls 7 which separate the cups. Preferably, to facilitate commercial handling, the walls 7 are of such height that they do not extend beyond about a third of the height of an egg. Concave wall sections 6 merge into posts 8 each of which contains in its upper face a socket or indentation 9 for a purpose which will presently appear. The posts 8 terminate well below the middle of the eggs and commercial handling of the eggs is thereby made possible. In cartons intended primarily for use in direct shipment, commercial handling is not required and the height of the walls 7 and posts 8 is not so important.

The convex wall sections 5 are spaced apart laterally such a distance as to be engaged by an egg when that egg is placed tip down in the cup. I have found that from the tip of the small end of an egg upwardly for a distance of approximately three-eights of an inch, there is very little difference in the circumference of the egg in the range of eggs of from twenty-four to twenty-nine ounces per dozen. Eggs of this size and of normal configuration will be firmly gripped by the convex walls which, because of the combination of intervening concave and convex section walls forming the cup, the egg gripping convex sections are capable of being deflected outwardly to conform to the contour of the egg. Some of the eggs, when so placed in the cup, will project therein far enough that the tips thereof rest upon the bottom 3 of the cups. In other instances, the egg may be supported solely by its contact with the convex wall sections and its tip may not at once engage the bottom 3, but will ultimately be forced into engagement therewith as will presently appear.

The circumferential lengths of the convex and concave wall sections of the cup in any plane above the planar cup bottom 3, approximately equal the circumference of the large end of an egg in a plane an equal distance from the large end of the egg. Thus for example, at one-eighth of an inch above the bottom 3, the combined lengths of the wall sections approximately equals the circumference of an egg at one-eighth of an inch from its large end. The construction thus enables the cup to receive the large end of an egg should the egg be so placed in the cup. The convex walls 5 will be displaced outwardly by the egg and will grip the egg and thus hold it securely in the cup.

The feet 4, depending below the bottom 3 of the cup, slope downwardly and outwardly from points that are closer to the center of the bottom 3 than the junctions of the convex wall sections 5 and the bottom. As a result, the contour of bottom 3 is generally cross-shaped, as will be seen best in Fig. 1. The areas of the bottoms of the feet are made as large as possible, consistent with molding practice, and preferably these areas combine to a value greater than the area of the bottom. The merging of the sloping walls of the feet and the convex wall sections 5 into the bottoms 3 support it firmly and give it some resiliency vertically, thereby to cushion any impacts imposed vertically on an egg tip resting on the bottom. Thus it will be seen that the eggs are cushioned within the cups themselves, and further cushioning at the bottom of an egg case and between the layers of cartons in the case is not necessary.

As will be seen from Figs. 2 to 5, inclusive, the cover consists of inverted cups 10 which are of such size as to fit over the large end of the egg. Depressed into the upper ends of those cups are bosses 11 which bear against the upper end of the egg. Depending below the bottom edges of the inverted cups 10 are feet 14 which register with the indentations 9 in the posts 8 of the tray, thereby to support the cover upon the tray and to lock the cover against movement laterally of the tray.

As will be seen in Figs. 3 and 4, when the tray of a second carton is placed upon the cover, the cups 20 thereof rest upon the tops of inverted cups 10 and the feet 21 thereof project into the depressions 11 in the cover. This arrangement firmly locks the tray of the second carton upon the cover of the first carton, and when the cartons are stacked in an egg case compartment in this manner, the entire load is thus locked together and can move only as a unit within the compartment.

Due to the sloping walls of the feet 4 of the trays and of the bosses 11 in the cover, the bottom of the tray 20 will not engage the top of the inverted cup 10, but rather will be suspended approximately a thirty-second of an inch thereabove by the engagement of the sloping portions of the feet 4 with the walls of the bosses 11; thus resiliency between the layers is achieved. When cartons are so stacked in an egg case and the cover thereof is drawn down into place, the bottoms of the tray cups may be forced down into engagement with the tops of the inverted cups in part at least. Furthermore, as the pack is thus tightened by the cover, any eggs that are suspended solely by contact with the convex walls such as eggs of large girth and eggs which have been placed in the cups large end down will be moved downwardly into engagement with the bottoms of the cups. The resiliency of the convex walls of the cups permit the eggs to embed themselves in the cup and there will be no loss of egg space in the compartment. There will still be sufficient resiliency in the pack to afford adequate protection to the eggs.

As is well understood by those skilled in the art, ventilation of eggs is important, particularly where the eggs are to be held in storage. As will be seen in Figs. 3 to 5, inclusive, adequate openings are provided in the edges of the carton so as to permit free circulation of air therethrough. The concave wall portions 6 are spaced away from the egg, as will be best seen in Fig. 4, and extend well below its tip so that adequate ventilation is secured.

In the cartons shown in Figs. 1 to 5 in the drawings, the trays are supported solely by the feet on the bottoms of the cups and are provided with posts with which the feet on the cover are registered. The trays are provided with feet and when the cartons are stacked one upon the other, the cups of an upper tray rest upon and are supported solely by the tops of the inverted cups in the cover immediately below.

It will be noted that, although the covers are locked on the trays against lateral movement with respect thereto, they are nevertheless easily removed from the trays without mutilation of either the tray or the cover. This is a new innovation in cartons of this type and permits inspection of the eggs for damage in shipment and handling of the eggs in accordance with commercial handling practice thereby for the first time permitting official grading of a car of eggs packed in cartons. Eggs out of storage and current receipts may be commercially handled when packed in my improved carton which therefore fully meets all the requirements of the shipper, market officials and jobbers. The cartons also provide protection to eggs in shipment to a degree never before achieved.

The teachings of the present invention may be applied advantageously to trays and covers of the type shown in my Patent No. 2,656,945, and one such adaptation is shown in the modified form of my invention illustrated in Figs. 6 and 7 of the drawings.

Fig. 6 is a plan view of the tray in which the cups, indicated generally at 30, have convex wall sections 31 and concave wall sections 32, with the convex wall sections rising out of the bottom member 33. Feet 34 project downwardly and outwardly from bottom 33 and merge into the concave and convex wall sections. The concave sections blend into posts 35 and feet 36, which posts and feet are alternated in rows disposed between adjacent rows of the cups. The convex sections blend into posts 35 and feet 36, which posts and feet are alternated in rows disposed between adjacent rows of the cups. The convex sections of adjacent cups together form walls 37 which separate the cups and terminate with their upper edges low enough to permit commercial handling of the eggs. The concave sections 32 adjacent the feet 36 terminate below the upper edges of the walls 37 as shown at 38; however, since eggs in the cups are widely spaced apart at these points, there is no danger of them getting together.

As will be seen best in Fig. 7, the feet 34 on the cups and the feet 36 of the tray terminate in a common plane so that when the tray is placed upon a planar surface it will be supported thereon by a plurality of feet on the tray and, in addition, by the four feet on each of the cups. This arrangement provides adequate support of the tray in an egg case compartment and renders the use of a bottom pad unnecessary.

The bottom surfaces of the feet 36 are provided with indentations or cavities 39 and the tops of the posts 35 are made convex, as indicated at 40, and these posts 35 terminate below the tops 41 of the inverted cups in the cover a distance equal to the distance that the feet 34 and 36 project below the bottoms 33 of the cups in the tray. As a result of this construction, when a tray is placed upon the cover as the cartons are being stacked one upon another, the concave portions 40 of the posts will register with the cavities 39 in the feet of the tray and the feet 34 on the tray cups will project into the indentations 42 in the inverted cups of the cover and the bottoms 33 of the cups will register with the tops 41 of the inverted cup. Thus the tray of the upper carton will be supported upon the cover of the lower carton at a plurality of points and will be locked thereon against lateral displacement by the engagement of the cup feet with the indentations in the cover and also by the projecting of the convex tops of the cover posts into the concave bottoms of the feet on the tray.

Owing to the sloping walls of the feet on the cups and the curved configuration of the indentation of the feet on the tray and posts on the cover, the bottoms 33 of the tray cups will come to rest approximately 1/32 of an inch above the top 41 of the cups in the cover, and when the cover of an egg case is drawn down into place to tighten up the pack, the members distort sufficiently to bring the bottom 33 into engagement with the top 41.

The combination of convex and concave walls in the cup provide resiliency so that eggs of varying sizes will be gripped and supported firmly in upright position as before, and should an egg be placed large end down, the cup will give sufficiently to hold the egg firmly in upright position and cushion the egg within the cup even though its tip end may not engage with the walls of the inverted cups in the cover.

The carton of the present invention is designed to be composed of molded material, either molded pulp such as is now commonly used in devices of this kind, or from synthetic resins of the type having resiliency comparable to that of pulp articles. Since the covers are entirely removable from the trays, inspection and commercial handling are possible. It will be noted that in the drawings the top of the tray is disposed somewhat below the center of the eggs held in the cups. This is essential in instances where commercial handling is a factor. In cartons designed for shipment direct from the packer to the consumer's outlet or to the consumers themselves, where commercial handling is not so essential, the tray may be relatively deeper and the feet on the cover correspondingly shorter within the teachings of the invention. In any case, it is contemplated that the egg space measured from the top to the bottom 33, to the under surface of the top 10 of the cover, shall be a full two and one-half inches, that being the dimension now as accepted as standard for eggs weighing between twenty-four and twenty-nine ounces per dozen.

Referring generally to Figs. 8–18, inclusive, 23 and 24, there is shown a second form of tray 50 (see specifically Figs. 8a and 10a) and cover 51 (see specifically Figs. 11a and 13a) which together form a carton 52, which cartons in turn may be arranged in the form of a stack 53 (see specifically Fig. 18) or a bundled stack 54 (see specifically Fig. 23) or a cased pair of stacks 55 (see specifically Fig. 24).

Referring specifically to Figs. 8, 8a, 9, 10, 10a, 16, 17 and 18, there is shown in various views the tray 50, which may be made of molded pulp, and I prefer molded pulp as the material for the tray when the carton 52 is used as an egg containing carton, and it is to be understood that other materials may also be used such as, for example, plastic materials including polyethylene, polyvinyls, including polyvinyl chloride and its copolymers, cellulose acetate, ethylcellulose, all suitably compounded for the purpose of moldability and resiliency, and these materials may be either opaque or transparent. When the trays are molded of pulp they may be molded by a suitable pulp molding process including suction or vacuum molding and when they are molded of other materials such as, for example, thermoplastic, they may be vacuum formed from sheet materials or they may be injection molded or compression molded, for example. These materials may be used for the covers 51 as well as for the trays 50. The trays 50 are generally rectangular in form and are provided with thirty-six egg cells 56 arranged in six rows with six cells in each row so as to form a generally symmetrical square pattern. Each of the corners 57 of the tray 50 includes a generally L-shaped downwardly depending flange 58 with a bevelled or chamfered portion 59 at the location where the two legs of the L would normally meet. The length of each of the symmetrical legs of the L-shaped flange 58 corresponds approximately to the sum of the diameters of two of the egg cells 56. The bevelled L-shaped flange 58 is formed integrally with each corner of the tray 50 and imparts strength to it. The margin of each symmetrical side of the tray 50 between aligned legs of the flanges 58 is formed with three generally semicircular recesses 60 which are located between the second and third rows, the third and fourth rows and the fourth and fifth rows of the cells 56. These recesses provide for ease of handling, for finger gripping locations, and for special bundling arrangements such as is shown, for example, in Fig. 23. In addition, the recesses 60 serve as markers for the saws 61 (see Fig. 8) which are utilized for the sawing of a nest 62 of trays 50 (see Fig. 9) into tray portions of twelve cells aligned in two rows of six. About the entire periphery of the tray 50 there is a narrow flat surface 63 which serves as a mating surface for corresponding surface portions on the mating cover 51 later to be described. Within the tray 50 and adjacent the egg cells 56 there are located twenty-five upstanding posts 64 arranged in five rows of five and each of the upstanding posts 64 includes portions 65 which are at a horizontal level corresponding to the narrow flat surface 63 and other dimpled portions 66 which are lower than the portions 65. When the tray 50 is in a normal position and is viewed from above, as in Fig. 8 and Fig. 16, the portions 65 appear to be generally square with rectangular projections at the diagonally opposed corners and the dimpled portions 66 appear to be similar to concave hemispheres.

Each of the thirty-six egg cells 56 of the tray 50 comprises a bottom 67, four upstanding and outwardly flared wall portions 68 which are convex in horizontal section. The convex wall portions 68 in addition to forming portions of the egg cells 56, when adjacent a post location, they, at the same time, form side wall portions of each of the twenty-five upstanding posts 64. These convex walls 68 are relatively wide adjacent the bottom of the egg cells 56 and become narrower as they extend upwardly until at the top of the posts 64, the side of the posts facing the egg cell is generally concave though angular in form and as heretofore described, the tops of the posts 64 are generally square with rectangular projections at diagonally opposed corners. Thus, it will be understood that a pair of parallel vertical planes generally trisecting opposed sides of the generally square tops of the posts 64 will mark off on the wall of the cell 56 a surface near the bottom of the egg which is convex and near the top of the egg a surface which, though angular in horizontal section, is generally concave. In the twenty egg cells 56 which are adjacent the outer margin of the tray 50 and particularly with respect to the walls extending upwardly from the bottoms 67 and particularly with respect to those wall portions 69 between the convex wall portions 68, when viewed from above, and the tray 50 is in normal position, the wall portions 69 are concave in horizontal section with a relatively small sectional linear dimension near the bottom and a relatively large sectional linear dimension near the top. With respect to the sixteen cells 56 which are spaced by at least one cell from the margin of the tray 50, generally upwardly extending concave walls 69 are of minor area because of the generally large U-shaped cutout portions 70 (see Fig. 18) between the posts 64 serving the referred-to sixteen cells 56. The twelve relatively small generally semicircular cutout portions 71, which occur adjacent the twelve recesses 60, form an upper margin of somewhat larger generally concave upstanding walls 69.

Below the bottom 67 of each egg cell 56 there extends four laterally spaced projecting feet or legs 72 which appear generally in the form of hemispherical depressions in the bottom of the egg cell 56 when the tray is viewed from above in normal position but are actually triangular projections when viewed from above when the tray is upside down, as in Figs. 10, 10a and 17. The legs or feet 72 are generally of relatively large triangular section immediately adjacent the bottom side of the bottom 67 and are of relatively small triangular section at the bottom-most portion (of the feet or legs 72). The apex line of each triangular foot or leg is generally pointed toward the central vertical axis of each egg cell 56 and extends downwardly and outwardly therefrom (see Fig. 18). A line drawn through the apexes of any two opposed legs 72 on any one egg cell will be parallel to two of the sides of the tray 50 and at right angles to the remaining two sides.

When the tray 50 is viewed from above, the six rows of six egg cells are parallel to one of the sides of the tray and the five rows of five posts are parallel to one of the sides of the tray but as the posts appear to be generally rectangular at the tops thereof it is pointed out that the sides of each of the generally rectangular tops of the posts are not parallel to any of the sides of the tray but are generally disposed at an angle of 45° thereto though the corners of the tops of the posts which have angular projections may have portions on said angular projections which are generally parallel or perpendicular to any one side of the tray 50.

Referring more specifically to Figs. 11, 11a, 12, 13, 13a, 14, 15 and 18, the cover 51 may be made of the same or similar material to that of which the tray 50 is made.

The cover 51 is of the same lateral dimensions as the tray 50; indeed, the cover 51 is adapted to mate with the tray 50, as shown in Fig. 18, for example. The cover 51 is provided with corner flanges 73 which, though somewhat differently formed, are generally similar to the L-shaped flanges 58 on the tray 50 and the flanges 73 do include a corresponding bevelled portion 74. Similarly, on each side of the cover and generally aligned with two aligned legs of adjacent corner flanges 73, there are disposed three generally semicircular recesses 75, which recesses 75 generally correspond to the recesses 60 on the tray 50 and extend laterally and inwardly toward the center of the bottom of the cover 51. The margins of the cover 51 are also formed with thirty-six additional recesses 76, six on a side. The recesses 76 extend upwardly from the bottom of the cover as clearly shown in Figs. 12 and 18. The recesses 76 may serve as finger lifting posts and also assist with ventilation. Sixteen of the recesses 76 are formed within the corner flanges 73, each corner flange having four recesses 76 formed therein. The three flat portions 77 between the four recesses 76 of each corner of the cover 51 serve to mate with the narrow flat surface 63 on the tray 50 and, accordingly, there are twelve flat surfaces 77 on the bottom of the cover 51 and at the margin thereof which mate with the narrow flat surface 63 on the top at the margin of the tray 50.

Corresponding to the twenty-five upstanding posts 64 on the tray 50 are the twenty-five downwardly depending column-like structures 78, the bottoms 79 of which are generally hemispherical in shape to mate with the dimpled portions 66 formed in the posts 64 of the trays 50. The bottoms 79 of the downwardly depending column-like structures 78 extend below the bottoms of the surfaces 77 in order that when the bottoms 79 of the downwardly depending column-like structures 78 are mated with the dimples 66 formed in the tops of the upstanding posts 64, the cover 51 and the tray 50 will be locked together at twenty-five places against relative lateral displacement.

Like the tray 50, the cover 51 has thirty-six egg cells 80 with six rows of six cells. Each of the egg cells 80 in the cover 51 includes a top 81 which is generally in the shape of a Maltese cross having four arms, the axes of which are generally disposed at an angle of 45° to the sides of the cover 51. Depending downwardly from adjacent sides of any two arms of the top 81 is an inwardly disposed wall portion 82 of convex shape in horizontal section so that each cell 80 of the cover 51 has four such convex wall portions extending from the top and these inwardly disposed convex wall portions present a convex surface to the top of an egg which may be underneath said cover. These inwardly disposed wall portions 82, which present a convex surface on the interior side of the egg cell 80, are wider in horizontal section near the top and narrower in horizontal section near the bottom of said wall portion 82. The interior wall portions 83 between the wall portions 82 present a concave surface on the inside of each cell 80 of the cover 51. The major portion of the wall surface of the downwardly depending column-like structures 78 is formed by the concave wall portions 83.

Like the upstanding posts 64 on the tray 50 which, when viewed from the bottom side of the tray 50 are hollow, so the downwardly depending column-like structures 78, when viewed from the top of the cover 51, are hollow.

Between each of the downwardly depending column-like structures 78 there is a cutout portion 88 (see Fig. 18) of generally inverted U-shape.

As the trays 50 may be arranged in a nest 62 as shown in Fig. 9, similarly the covers 51 may be arranged in a nest 84, as shown in Fig. 12. It will be noted that the flanges aid in the rapid disassociation of one tray from the nest and similarly one cover from its nest so that the trays and covers may be used as needed.

After a tray 50 has been loaded with eggs and a cover 51 mated therewith, as has already been described, to form the carton 52, it may be desirable to stack one carton 52 upon another and this is accomplished in the following manner:

The first carton 52 will rest on a horizontal surface with the bottoms of the feet or legs 72 engaging said horizontal surface so that the bottoms of the eggs within the carton 52 will not be in direct or indirect contact with any rigid surface but will be fully and completely resiliently supported without the need for any padding underneath the carton 52. Thereupon a second tray 50 will be disposed in its normal position above the first cover 51 with the specially formed legs 72 engaging the upper side 85 of the convex wall portions 82. The upper sides 85 of the cover 51 appear to be concave when the cover 51 is viewed from above. As there are four depressed sides 85 for each cell 80 and as there are four laterally disposed legs 72 for each cell 56 in the tray 51, and as the axis of the four depressed sides 85 are disposed both parallel and at right angles to the sides of the cover, and as the legs 72 are similarly disposed with respect to the sides of the tray, there will be four places of interengagement between the first cover 51 and the second tray 50 for each of the egg cells or one hundred and forty-four places of interengagement between the first cover and the second tray to insure perfect alignment in the stacking operation. Thereafter, a second thirty-six eggs will be loaded in said second tray and then the second cover will be placed upon the second tray and interengaged at the twenty-five places where the downwardly depending column-like structures 78 mate with the dimpled portions 66 in the upstanding posts 64 and the twelve flat surfaces 77 on the cover mate with the narrow flat marginal surface 63 on the tray. Thus, a second carton 52 will be formed upon a first carton 52 which is resiliently supported upon a horizontal surface in a manner to protect the delicate and fragile contents thereof. A third carton 52 may be superimposed upon the second carton 52 in a similar manner. A stack 53 of five cartons may thus be readily formed by following the procedure hereinabove set forth, in which stack there will be housed fifteen dozen eggs in a space corresponding precisely in all respects to one-half of a standard egg case 86, as illustrated in Fig. 24. Two stacks 53 of five cartons each will completely fill and precisely fit within a standard case 86 and thus packaged the case 86 will contain a standard quantity of eggs; that is, thirty dozen eggs, and all the eggs will normally be arranged in each half of the case with three dozen eggs to a layer, fifteen dozen to half a case, with five layers on each side of the case with the bottom-most layers resiliently supported and fully protected from the bottom of the case, the outermost rows of eggs in any layer fully and resiliently supported from the sides of the case, and with the top cover of each of the two stacks fully and completely protecting the topmost layer from the top of the case. Thus, it will be understood that the cartons and stacks described completely and fully protect the eggs, whether the eggs be packaged in carton form, in stack arrangement, as shown in Fig. 24, within a case, or as shown in Fig. 23, wherein the bundle of cartons are held together in the form of a stack 54 by the tension members 87 which may be in the form of straps or cord or tape, or the like.

Referring specifically to Fig. 23, the tension members 87 are shown to be in engagement with the recesses 60 of each tray 50, the recesses 75 of each cover 51, as well as the surfaces between the aligned rows of egg cells 56 on the outside of the lowermost tray 50 and the corresponding outer surfaces between the aligned cells 80 on the top side of the uppermost cover 51.

Referring specifically to Figs. 19–22, inclusive, there is shown another modified form of tray 100 and cover 101. The tray 100 illustrated in Figs. 19 and 20 is generally similar to the tray 50 illustrated in Figs. 8, 8a, 9, 10, 10a, 16 and 17 with variations. In the tray 100, the feet or legs 172 are solid whereas the feet or legs 72 in the tray 50 are hollow with the hollow side on the interior of the egg cell. In the tray illustrated in Figs. 19 and 20, the generally large U-shaped cutout portions 170 are angular in formation whereas the generally large U-shaped cutout portions 70 of the tray 50 are not angular, as shown in Fig. 18.

The cover 101 illustrated in Figs. 21 and 22 is adapted to mate with the tray 100 illustrated in Figs. 19 and 20 in the same manner as that described in connection with the tray 50 and cover 51.

Referring generally to Figs. 28–35, inclusive, there is shown my preferred form of tray 550 (see specifically Figs. 28, 28a, 29, 29a, 34 and 35) and cover 551 (see specifically Figs. 30, 30a, 31, 31a, 32 and 33), which together form a carton 552, a fragmentary vertical section of which is shown in Fig. 38, which cartons 552 may be arranged in a stack similar to the stack 53 of cartons 52 shown in Fig. 18, or a bundled stack 554 shown in Fig. 36, or a cased pair of stacks similar to the cased pair of stacks 55 shown in Fig. 24.

Referring specifically to Figs. 28, 28a, 29, 29a, 34 and 35, there is shown in various views the tray 550 which may be made of molded pulp or other material, as already recited in connection with the tray 50. Like the trays 50, the trays 550 are generally rectangular in form and are provided with thirty-six egg cells or cups 556 arranged in six rows with six cells or cups in each row so as to form a generally symmetrical square pattern. Each of the corners 557 of the tray 550 includes a generally L-shaped downwardly depending flange 558 (see Fig. 35) with a bevelled or chamfered portion 559 at the location where the projections of the two legs of the L would normally meet. The dimension of the flange extension 558 is considerably less than the corresponding dimension of the flange 58 of the tray 50 and this dimension of the flange 558 may be approximately one-half or somewhat less than the one-half of the corresponding dimension of the flange 58 of the tray 50. The flange 558 imparts strength to the tray 550 but its smaller dimension facilitates manual manipulation of the tray. The length of each of the symmetrical legs of the L-shaped flanges 558 corresponds approximately to the sum of the diameters of two of the egg cells 556. The margin of each symmetrical side of the tray 550 between aligned legs of the flanges 558 is formed with three generally semicircular recesses 560 which are located between the second and third rows, the third and fourth rows, and the fourth and fifth rows of the cells 556. These recesses 560 provide for ease of handling, for finger gripping locations, and for special bundling arrangements such as is shown, for example, in Fig. 36. In addition, the recesses 560 serve as markers for saws like the saws 61 shown in Fig. 8, which may be utilized for the sawing of a nest of trays 550 (similar to the nest 62 shown in Fig. 9) into tray portions of twelve cells aligned in two rows of six as shown, for example, in Fig. 37. The recesses 560 are also flanged at 560a, which flanges 560a are continuations of the flanges 58 as shown in Fig. 35. These flanges 560a impart strength to the tray 550 and provide for improved gripping contact.

About the entire periphery of the tray 550 on its upper side, there is a narrow flat surface 563 which serves as a mating surface for corresponding surface portions on the mating cover 551 later to be described. Within the tray 550 and adjacent the egg cells 556 there are located twenty-five upstanding posts 564 arranged in five rows of five and each of the upstanding posts 564 includes portions 565 which are at a level corresponding to the narrow flat surface 563 and also includes dimpled portions 566 which are lower than the portions 565. When the tray 550 is in the normal position and is viewed from above, as in Figs. 28 and 34, the portions 565 appear to be generally polygonal projections at the diagonally opposed corners of the posts 564 and the dimpled portions 566 appear to be similar to concave hemispheres.

Each of the thirty-six egg cells or cups 556 of the tray 550 comprises a bottom 567, four upstanding and outwardly flared wall portions 568 which are convex in horizontal section at 568a and concave in horizontal section at 568b. The wall portions 568, in addition to forming portions of the egg cells 556, when adjacent a post location, they, at the same time, form strong side wall portions of each of the twenty-five upstanding posts 564. By providing the wall portions 568 with both convex and concave horizontal sections, the strength of the posts have been materially increased so that they may carry considerable loads and thereby serve to fully protect the delicate articles to be contained within the egg cells or cups.

These walls 568 are relatively wide adjacent the bottom of the egg cells 556 and become narrower as they extend upwardly until at the top of the posts 564, the portion 568b of the posts facing the egg cell is generally concave and in cooperation with the portions 565 appear to be somewhat angular in form so that the tops of the posts 564 appear to be generally square with polygonal projections at diagonally opposed corners.

Below the bottom 567 of each cell 556 there extends four laterally spaced projecting feet or legs 572 which appear generally in the form of hemispherical depressions in the bottom of the egg cell 556 when the tray is viewed from above in normal position but are actually angular projections when viewed from above when the tray is upside down, as shown in Figs. 29, 29a and 35. The legs or feet 572 are of larger horizontal section immediately adjacent the bottom side of the bottom 567 and are of relatively smaller section at the bottom-most portion (of the feet or legs 572). Two opposite sides of each of the legs 572 are tapered toward each other and in the general direction of the center of the corresponding egg cell. A third side of the legs 572 is generally in the plane of the concave (from the inside of the egg cells) upstanding walls 569 which alternate with the walls 568 in forming the walls of the interior of the egg cells 556. A fourth side of the legs 572 (see Fig. 38) is inclined generally toward the interior of the egg cells.

When the tray 550 is viewed from above, in the twenty egg cells 556 which are adjacent the outer margin of the tray 550, and particularly with respect to the walls extending upwardly from the bottoms 567 and particularly with respect to those concave wall portions 569 between the wall portions 568, the wall portions 569, which are concave in horizontal section, have a relatively smaller sectional linear dimension near the bottom and a relatively large sectional linear dimension near the top. With respect to the sixteen cells 556 which are spaced by at least one cell from the margin of the tray 550, generally upwardly extending concave walls 569 are of minor area because of the generally large U-shaped cutout portions 570 (see Fig. 38) between the posts 564 serving the referred to sixteen cells 556. The twelve relatively small generally semicircular cutout portions 571, which occur adjacent the twelve recesses 560, form an upper margin of somewhat larger generally concave upstanding walls 569.

When the tray 550 is viewed from above, the six rows of six egg cells are parallel to one of the sides of the tray and the five rows of five posts are parallel to one of the sides of the tray, but as the posts appear to be generally rectangular at the tops thereof, it is pointed out that the sides of each of the generally rectangular tops of the posts are not parallel to any of the sides of the tray but are generally disposed at an angle of 45° thereto though the corners of the tops of the posts which have angular projections may have portions on said angular projections which are generally parallel or perpendicular to any one side of the tray 550.

Referring more specifically to Figs. 30, 30a, 31, 31a, 32 and 33, the cover 551 may be made of the same or similar material of that of which the trays 550 or 50 are made.

The cover 551 is of the same lateral dimensions as the tray 550; indeed the cover 551 is adapted to mate with the tray 550 as shown in Fig. 38, for example. In general, the construction of the cover 551 is the same as that already described in connection with the cover 51 but the corner flanges 573 have been somewhat reduced in size so that the flange extension is of approximately equal dimension to the depth of the recesses 576, which recesses 576 occur six on a side so as to make a total of thirty-six recesses 576 which are in addition to the semi-circular recesses 575 which occur three on a side to make a total of twelve recesses 575 which recesses 575 correspond to the recesses 75 of the cover 51. The remaining structure of the covers 551 corresponds to the structure of the covers 51 already described.

The cooperation of the cover 551 with the tray 550 is generally the same as that already described in connection with the trays 50 and covers 51. However, the cartons 552 formed of trays 550 and covers 551 will be stronger and may be more easily manipulated than the cartons 52 formed of the trays 50 and covers 51.

Referring specifically to Fig. 36, the tension members 587 are shown to be in engagement with the recesses 560 of each tray 550 and the recesses 575 of each cover 551, as well as the surfaces between the aligned rows of egg cells 556 on the outside of the lowermost tray 550 and the corresponding outer surfaces between the aligned cells or inverted cups on the top side of the uppermost cover 551.

Referring to Fig. 25, wherein there is shown a carton for one dozen eggs, it will be noted that the tray 200 is a portion of the tray 50 and the cover 201 is a portion of the cover 51. The tray 200, as shown, contains two rows of six egg cells and the cover 201 corresponds to the tray 200. The sleeve 202 serves to hold together the tray 200 and cover 201 and the arrangement is such that the combination of the tray 200 and cover 201 may be moved into the sleeve 202 in the direction as shown by the arrow, so as to form an assembled egg package for one dozen eggs. It is to be understood that the sleeve 202 may be formed by wrapping a web of material about the tray 200 and cover 201 to form the package instead of effecting the assembly by sliding the tray 200 and cover 201 within a sleeve 202. Not only may the tray 200, cover 201 and sleeve 202 be made of paper pulp, but they also may be made of plastic materials as already referred to, including transparent plastics.

Referring to Fig. 37, wherein there is shown a package for one dozen eggs, the tray 600 is a portion of the tray 550 and the cover 601 is a portion of the cover 551. The tray 600, as shown, contains two rows of six egg cells and the cover 601 corresponds to the tray 600. The sleeve 602 serves to hold together the tray 600 and the cover 601 and the arrangement is such that the combination of tray 600 and cover 601 may be moved into the sleeve 602 in the direction shown by the arrow, so as to form an assembled egg package for one dozen eggs. It is to be understood that the sleeve 602 may be formed by wrapping a web of material about the tray 600 and the cover 601 to form the package instead of effecting the assembly by sliding the tray 600 and the cover 601 within the sleeve 602. Not only may the tray 600, cover 601 and the sleeve 602 be made of paper pulp, but they also may be made of plastic materials as already referred to, including transparent plastics.

With respect to the packages shown in Figs. 25 and 37, the trays 200 and 600 have been described in such fashion as to indicate that the loading of these packages takes place after the large thirty-six-cell trays have been sawn into twelve-cell trays. It is contemplated, however, that in addition to proceeding in this fashion, the thirty-six-cell trays 50 and 550 may be loaded with eggs and covered with the covers 51 and 551 and thereafter may be sawn into loaded twelve-cell units adapted to cooperate as already described in connection with sleeves 202 and 602.

Trays 200 may be formed by sawing a nest 62 of trays 50 illustrated in Fig. 9, with saws 61 arranged as shown in Fig. 8. Thus, it will be understood that a nest 62 when cut by the saws 61 will form three sub-nests of individual trays 200 and similarly a nest of covers 84, illustrated in Fig. 12, may be cut by the saws 61 (see Fig. 11) to form sub-nests of covers 201 and each of the trays 200 and covers 201 will comprise two rows of six egg cells. The tray 600 may be formed by sawing a nest of trays 550 in the manner that the nest 62 of trays 50 is sawn, as illustrated in Fig. 9, with saws 61 arranged as shown in Fig. 8. Thus, it will be understood that nests of trays 550 and covers 551 when cut by the saws 61 will form three sub-nests of individual trays 600 and similarly three sub-nests of covers 601 in which the trays 600 and covers 601 will each comprise two rows of six egg cells.

In those instances in which trays and covers of thirty-six cells are utilized for primary shipments, and wherein later transfers are contemplated to one dozen egg containing cartons, the used trays 50 or 550 and covers 51 or 551 may be nested after they are unloaded, then cut by the saws 61 to form sub-nests of individual trays 200 or 600 and covers 201 or 601 which may subsequently be used to form the one-dozen egg package illustrated in Fig. 25 and Fig. 37, as already described. In following this process, each tray 50 or 550 will form three trays 200 or 600 and each cover 51 will form three covers 201 or 601 with the attendant effecting of great savings in packaging material and storage space, and the like.

While the trays and covers such as, for example, the tray 50 and the tray 550 and the cover 51 and the cover 551, have been described as having thirty-six egg cells in six rows of six, the trays and covers may be formed as an integral combination tray and cover 300 of two rows of six cells, as shown in Fig. 26, or three rows of four cells, as shown in Fig. 27, or a combination tray and cover 400 such as, for example, as shown in Fig. 27. The individual egg cells of the egg package 300 will correspond to the egg cells of the tray 50 or the tray 550 and cover 51 or cover 551, for example. The individual tray cells 400 will correspond to the egg cells of the tray 50 or the tray 550 and cover 51 or cover 551. Thus, it will be understood that the invention is not limited to cartons for containing three dozen eggs in six rows of six, but it may also be utilized for one dozen egg containing cartons such as shown, for example, in Figs. 26 and 27 and that the materials utilized in connection with the fabrication of the cartons 300 and 400 may not only be molded pulp but instead, other materials, previously referred to, may be utilized such as, for example, plastics including transparent plastics.

The carton 300 and the carton 400 may be arranged so that the tray and cover are fastened together in any suitable manner such as, for example, by sealing tape or wrapper or a sleeve 202 such as shown in Fig. 25.

Both the tray and the cover of my invention are thin-walled, very strong, resilient, flexible structures for the safe accommodation of delicate and perishable good like fresh eggs and which, like most natural objects, (even though they be graded) vary somewhat in size and shape.

It will be obvious to those skilled in the art that various changes may be made without departing from the spirit of the invention and therefore the invention is not limited to what is shown in the drawings and described in the specification but only as indicated in the appended claims.

What is claimed is:

1. A cup for supporting an egg firmly in upright position in a carton, comprising a planar bottom adapted to engage the tip of an egg, four feet extending downwardly and outwardly from said bottom and terminating in a plane that is parallel to the upper surface of said bottom, four convex wall sections extending upwardly and outwardly from said bottom, four concave wall sections extending upwardly and outwardly from the outer ends of said feet and intervening between and blending into said convex wall sections, said convex and concave wall sections each aggregating approximately one-half of the perimeter of the cup, said convex wall sections yielding to grip an egg adjacent its tip to firmly hold it upright on the cup, and said feet cushioning the carton when placed upon the bottom of an egg case.

2. A cup for supporting an egg firmly in upright position in a carton, comprising a planar bottom, a plurality of feet extending downwardly and outwardly from said bottom and terminating in a plane that is substantially parallel to said bottom, the aggregate area of said feet in said plane being approximately equal to the area of said bottom, a plurality of convex wall sections disposed in spaced apart relation and extending upwardly and outwardly from the edges of said bottom between said feet, said sections being formed with long radii so as to be resilient and being adapted to grip an egg along spaced apart bands to hold it upright in the cup, a plurality of spaced apart concave wall sections extending upwardly and outwardly from the outer ends of said feet and intervening between and merging into said convex wall sections, said convex and concave wall sections being arranged to permit commercial handling of the egg.

3. A cup for supporting an egg firmly in upright position in a carton, comprising a planar bottom, a plurality of feet extending downwardly and outwardly from said bottom and terminating in a plane that is parallel to the upper surface of said bottom, a plurality of convex wall sections extending upwardly and outwardly from said bottom, a plurality of concave wall sections intervening between and blending into said convex wall sections and extending upwardly and outwardly from said feet, said convex wall sections gripping an egg to firmly hold it uprightly in said cup and permitting commercial handling thereof.

4. A cup for supporting an egg firmly in upright position in a carton, comprising a planar bottom adapted to engage the tip of an egg, four feet extending downwardly and outwardly from said bottom and terminating in a plane that is parallel to the upper surface of said bottom, four convex wall sections extending upwardly and outwardly from said bottom, said wall sections being spaced apart throughout their heights less than the diameters of eggs at corresponding distances from their tips, beginning at a plane through the egg in which the diameter of the egg equals the width of said bottom, four concave wall sections extending upwardly and outwardly from said feet and intervening between and blending into said convex wall sections, said concave sections being spaced apart throughout their heights at least as far as the diameters of eggs at corresponding distances from their large ends, said convex and concave wall sections terminating below the middle of an egg in the cup, said convex wall sections yielding to grip an egg adjacent its tip to hold it upright in the cup.

5. A cup for supporting an egg firmly in upright position in a carton, comprising a planar bottom adapted to support an egg, four feet extending downwardly and outwardly from said bottom and terminating in a plane that is parallel to the upper surface of said bottom, four convex wall sections extending upwardly and outwardly from said bottom, said wall sections being spaced apart throughout their heights less than the diameters of eggs at corresponding distances from their tips, beginning at a plane through the egg in which the diameter of the egg equals the width of said bottom, four concave wall sections extending upwardly and outwardly from said feet and intervening between and blending into said convex wall sections, said concave sections being spaced apart throughout their heights at least as far as the diameters of eggs at corresponding distances from their large ends, the circumference of said convex and concave wall sections combined in any plane above said bottom being at least equal to the circumference of an egg in a plane at a corresponding distance from its large end to enable the convex walls to distort and grip an egg to hold it firmly upright in the cup regardless of which end of the egg is placed in the cup.

6. In a carton for eggs, a tray containing a plurality of cups for supporting eggs upright with their tip ends down, each cup comprising a planar bottom, a plurality of feet depending downwardly and outwardly from said bottom and terminating in a plane that is substantially parallel to the upper surface of said bottom, spaced apart convex wall sections extending upwardly and outwardly from said bottom, concave wall sections extending upwardly and outwardly from said feet and intervening between and blending into said convex wall sections, said convex wall sections gripping an egg in spaced apart bands to hold it upright in the cup, a cover containing a like plurality of inverted cups adapted to fit over the large ends of eggs supported in the tray, feet on said cover depending therefrom between said inverted cups, posts on said tray containing recesses in their upper ends into which the feet on said cover project to lock the cover on the tray and to permit the covers to be removed easily to permit inspection of the eggs for damage, bosses depressed into the upper portions of said inverted cups adapted to bear against the large ends of the eggs, which bosses form recesses in the outer surfaces of the inverted cups with which the feet of the cups of the tray of a second carton register to lock the second carton against lateral movement on the first carton when the cartons are stacked one upon the other.

7. In a carton for eggs, a tray containing a plurality of cups uniformly spaced apart in uniformly spaced apart rows, each cup comprising a planar bottom, opposed feet extending downwardly and outwardly from said bottom to support and cushion the tray, opposed resilient convex walls extending upwardly and outwardly from the edges of said bottom between said feet, intervening concave walls extending upwardly and outwardly from the outer edges of said feet, posts on said tray into which said concave walls merge, said posts extending upwardly no more than to the middle of an egg in the cup, said posts containing sockets formed in their upper surfaces, said convex walls gripping an egg in spaced apart bands adjacent the tip to hold the egg firmly in upright position in the tray, a cover containing a plurality of inverted cups each adapted to snugly embrace the large end of an egg that is thus supported in the tray, feet on said cover depending below said inverted cups and engaging said sockets in the posts to support the cover on the tray and to lock the cover and tray against lateral movement with respect to each other while permitting the cover to be removed with ease to permit inspection of the eggs for damage and handling thereof commercially, bosses projecting into said inverted cups at the tops thereof adapted to bear against the large ends of the eggs, said bosses forming recesses in the outer surface of the cover into which the feet of the tray of a second carton fit to lock that carton against lateral movement on the first carton when the cartons are stacked one upon the other.

8. In a carton for eggs, a tray, a plurality of cups in said tray uniformly spaced in uniformly spaced rows, feet and posts on said tray alternated in rows disposed between adjacent rows of cups, said feet being recessed on their bottoms and said posts being recessed on their tops, feet depending from each of said cups and terminating in in the plane through the bottoms of the tray feet, a cover, inverted cups in said cover uniformly spaced in uniformly spaced rows, feet and posts on said cover alternated in rows disposed between adjacent rows of inverted cups, said cover feet terminating in convex ends adapted to register with the recesses in the posts on the tray to support the cover thereon and to prevent lateral movement of the cover with respect to the tray, said cover posts terminating in convex ends disposed below the tops of the inverted cups, said inverted cups containing recesses into which the feet on the cups of a second tray project as the feet of the tray are registered with the posts on the cover to support the second tray on the cover and to prevent lateral movements therebetween.

9. In a carton for eggs, a tray formed of molded material and containing a plurality of cups uniformly spaced apart and located in uniformly spaced apart rows, each cup comprising a planar bottom, feet depending downwardly and outwardly from said bottom, spaced apart convex walls extending upwardly and outwardly from said bottom and adapted to grip an egg adjacent its tip to hold it uprightly in the cup, concave wall sections extending upwardly and outwardly from said feet and intervening between and merging into said convex walls, feet on the tray depending below the cups and terminating in a concave bottom, the lowermost portion of which lies in a plane through the bottoms of the feet on the cups, posts projecting upwardly from the tray and terminating in upper concave faces, said feet and posts alternating in rows between adjacent rows of cups, a molded cover for said tray, a plurality of inverted cups in said cover each adapted to fit over the large end of an egg that is supported in a cup in the tray, bosses projecting into said inverted cups and adapted to bear against the end of an egg disposed therein, said bosses forming recesses in the outer surfaces of the cup, feet on said cover depending therefrom between the inverted cups and terminating in convex lower ends, posts on said cover projecting upwardly between the inverted cups and terminating in convex upper ends, said feet and posts alternating in rows between adjacent cups so that the feet register with the posts on the tray and the convex end of the foot with the concave end of the post to lock the cover laterally with respect to the tray, the posts on said cover terminating below the tops of the inverted cups so that when a tray is placed on the cover with the feet on its cups registered with the recesses in the inverted cups, the feet on the tray will register with and the concave bottoms thereof will fit over the convex end of the post on the cover to lock the tray against lateral movement with respect to the cover.

10. An egg packing assembly comprising a plurality of carriers, each having a bottom section less than one-half the height of an egg and composed of rows of relatively small egg-receiving pockets provided with cushioning elements spaced outwardly from their centers and extending downwardly below the bottoms thereof, said bottom sections also having upstanding posts with relatively large upper portions provided with central detents, and a complementary cover section, more than one-half the height of an egg, having relatively large egg-receiving pockets inverted over the pockets in said bottom section, said cover section having detent means in the upper portions of its pockets spaced outwardly from the center thereof and relatively small downwardly extending projections between pockets for engaging the detents in the posts of said bottom section, said carriers being arranged in superposed relation with the corresponding pockets of adjacent carriers in upright alignment and with the cushioning elements of the bottom sections engaging the detent means in the cover section of the next lower carrier.

11. An egg tray for an egg packing assembly, egg cells in said egg tray, each of said cells comprising a bottom, upwardly and outwardly extending walls from each of said cell bottoms, a first series of said walls being of concave horizontal section, a second series of said walls having lower portions of convex horizontal section and upper portions of concave horizontal section, the walls of said first series being alternated with the walls of said second series about each egg cell.

12. The structure recited in claim 11, a pair of depressions at the ends of the base of each of the walls of said second series, said depressions extending to a level below the bottom side of the bottom of each egg cell and forming legs for said egg cell.

13. The structure recited in claim 12, each of said legs having two sides inclined toward each other and in the general direction of the center of the bottom of each egg cell, one side in the general plane of the walls of said first series and a fourth side extending generally toward the center of the cell formed by the said bottom and upwardly and outwardly extending walls.

14. An egg tray for an egg packing assembly, egg cells in said egg tray, each of said cells comprising a bottom, upwardly and outwardly extending walls in each of said cell bottoms, some of said walls forming separating posts between some of said cells, a first series of walls having bases of generally concave horizontal section, a second series of walls having bases of generally convex horizontal section, said second series of walls also forming the walls of said posts, the upper portions of said second series of walls being formed with concave parts in horizontal section whereby the structure of said posts is increased in strength.

15. An egg tray comprising an egg cell, four posts about said egg cell, said egg cell comprising a bottom four depressions in said egg cell angularly spaced from each other by 90° with respect to the vertical axis of said egg cell, said depressions forming four legs on the bottom of said egg cell including four generally upstanding and outwardly extending convex surfaces, each of said convex surfaces forming part of the wall structure of said four posts, a complementary cover for said tray, said cover including a complementary cell and four depending column-like structures for cooperation with the four posts in said tray, said posts being formed with depressions in the tops thereof, said four column-like depending structures being formed with lowermost ends for cooperation with the depressions in the tops of said posts, said cell in said cover being formed with four inwardly disposed depressions in vertical alignment with the four depressions in the bottom of said cell in said tray whereby when said tray is disposed on top of said cover the legs on said tray will mate with the depressions on the top of said cover.

16. A multi-leg molded pulp egg tray comprising a plurality of egg cells in said tray, each of said cells comprising a bottom and side wall means for supporting an egg with its major axis generally upright and for completely preventing it from toppling over, each of said cells having a plurality of laterally spaced legs depending downwardly from the egg cell bottom, a portion of said egg cell bottom being integrally connected with the side wall means at a level above the bottom of said legs.

17. An egg tray according to claim 16, wherein the side wall means of each cell comprises side walls extending upwardly and outwardly from each of said cell bottoms, said side walls including a convex portion, a pair of depressions at the base of each convex portion, said depressions extending to a level below the bottom side of the bottom of each egg cell and forming said legs for said egg cell.

18. An egg tray for an egg packing assembly, comprising thirty-six egg cells arranged in six rows of six cells, twenty-five upstanding posts arranged in five rows of five posts with four egg cells about each post, each of said cells including an upwardly and outwardly extending convex portion forming part of the wall structure of said posts, each of said cells including a plurality of laterally spaced downwardly depending legs, the tops of said upstanding posts being generally square with generally rectangular projections at corners thereof, said tops being formed with depressions therein.

19. A multi-leg molded pulp egg tray comprising a plurality of egg cells in said tray, each of said cells comprising a bottom and side walls, each of said cells having a plurality of laterally spaced legs depending downwardly from the egg cell bottom, a portion of said egg cell bottom being integrally connected with the side walls at a level above the bottom of said legs, a first series of said side walls being of concave horizontal section, a second series of said side walls having lower portions of convex horizontal section and upper portions of concave horizontal section, the walls of said first series being alternated with the walls of said second series in each egg cell.

20. An egg tray according to claim 19, characterized in that a pair of depressions is provided at the ends of the base of each of the walls of said second series, said depressions extending to a level below the bottom side of the bottom of each egg cell and forming said legs for said egg cell.

References Cited in the file of this patent

UNITED STATES PATENTS

| Number | Name | Date |
|---|---|---|
| 1,097,142 | Schmunk | May 19, 1914 |
| 1,220,670 | Milliron | Mar. 27, 1917 |
| 1,351,708 | Tiemann | Aug. 31, 1920 |
| 1,857,984 | Swift | May 10, 1932 |
| 1,917,491 | Bowerman | July 11, 1933 |
| 1,956,955 | Kronenberger | May 1, 1934 |
| 1,990,145 | Swift | Feb. 5, 1935 |
| 2,014,851 | Kronenberger | Sept. 17, 1935 |
| 2,226,904 | Gates | Dec. 31, 1940 |
| 2,311,473 | Schwartzberg | Feb. 16, 1943 |
| 2,345,274 | Manson | Mar. 28, 1944 |
| 2,346,161 | Grant | Apr. 11, 1944 |
| 2,378,627 | Grant | June 19, 1945 |
| 2,571,748 | Newman | Oct. 16, 1951 |
| 2,606,708 | Irvan | Aug. 12, 1952 |

FOREIGN PATENTS

| Number | Country | Date |
|---|---|---|
| 496,007 | Great Britain | Nov. 23, 1938 |